US012619357B2

(12) United States Patent
Esaka et al.

(10) Patent No.: US 12,619,357 B2
(45) Date of Patent: \*May 5, 2026

(54) MEMORY SYSTEM CONTROLLING NONVOLATILE MEMORY

(71) Applicant: KIOXIA CORPORATION, Tokyo (JP)

(72) Inventors: Naoki Esaka, Kawasaki (JP); Shinichi Kanno, Ota (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/791,933

(22) Filed: Aug. 1, 2024

(65) Prior Publication Data

US 2024/0393946 A1 Nov. 28, 2024

Related U.S. Application Data

(63) Continuation of application No. 18/327,108, filed on Jun. 1, 2023, now Pat. No. 12,079,473, which is a
(Continued)

(30) Foreign Application Priority Data

Jan. 16, 2020 (JP) ................................. 2020-005292

(51) Int. Cl.
*G06F 3/06* (2006.01)

(52) U.S. Cl.
CPC ............ *G06F 3/0608* (2013.01); *G06F 3/064* (2013.01); *G06F 3/0656* (2013.01); *G06F 3/0659* (2013.01); *G06F 3/0688* (2013.01)

(58) Field of Classification Search
CPC ......... G06F 12/0246; G06F 2212/7209; G06F 3/0608; G06F 3/061; G06F 3/064;
(Continued)

(56) References Cited

U.S. PATENT DOCUMENTS 6,278,718 B1 * 8/2001 Eschholz .............. H04L 12/422
370/503
6,505,229 B1 * 1/2003 Turner .................. G06F 9/3851
718/107
(Continued)

FOREIGN PATENT DOCUMENTS

JP 2019-49995 A 3/2019
JP 2019-191909 A 10/2019
JP 2021-81981 A 5/2021

*Primary Examiner* — Hashem Farrokh
(74) *Attorney, Agent, or Firm* — Oblon, McClelland, Maier & Neustadt, L.L.P.

(57) ABSTRACT

According to one embodiment, a controller of a memory system performs a first operation a plurality of times for each of a plurality of first blocks. The first operation includes a write operation for writing data in a first write mode for writing m-bit data per memory cell and a data erase operation. While a second block is not a defective block, the controller performs a second operation a plurality of times for the second block. The second operation includes a write operation for writing data in a second write mode for writing n-bit data per memory cell and a data erase operation. When the second block is a defective block, the controller selects a first block from the plurality of first blocks, and writes second write data to the selected first block in the second write mode.

20 Claims, 18 Drawing Sheets

Related U.S. Application Data continuation of application No. 17/536,558, filed on Nov. 29, 2021, now Pat. No. 11,704,021, which is a continuation of application No. 17/019,955, filed on Sep. 14, 2020, now Pat. No. 11,216,188.

(58) Field of Classification Search

CPC .... G06F 3/0656; G06F 3/0659; G06F 3/0679; G06F 3/0688; G06F 2212/7203; G06F 2212/7204; G06F 3/0652; G06F 3/0658; Y02D 10/00

USPC .......................................................... 711/103

See application file for complete search history.

(56) References Cited

U.S. PATENT DOCUMENTS

| | | | |
|---|---|---|---|
| 10,241,859 B2 | 3/2019 | Kanno | |
| 2005/0060683 A1* | 3/2005 | Douceur | G06F 9/52 |
| | | | 717/100 |
| 2017/0024276 A1 | 1/2017 | Kanno | |
| 2019/0042098 A1 | 2/2019 | Li et al. | |
| 2019/0146907 A1 | 5/2019 | Frolikov | |
| 2019/0332316 A1 | 10/2019 | Kanno et al. | |
| 2021/0149797 A1 | 5/2021 | Kanno et al. | |

* cited by examiner

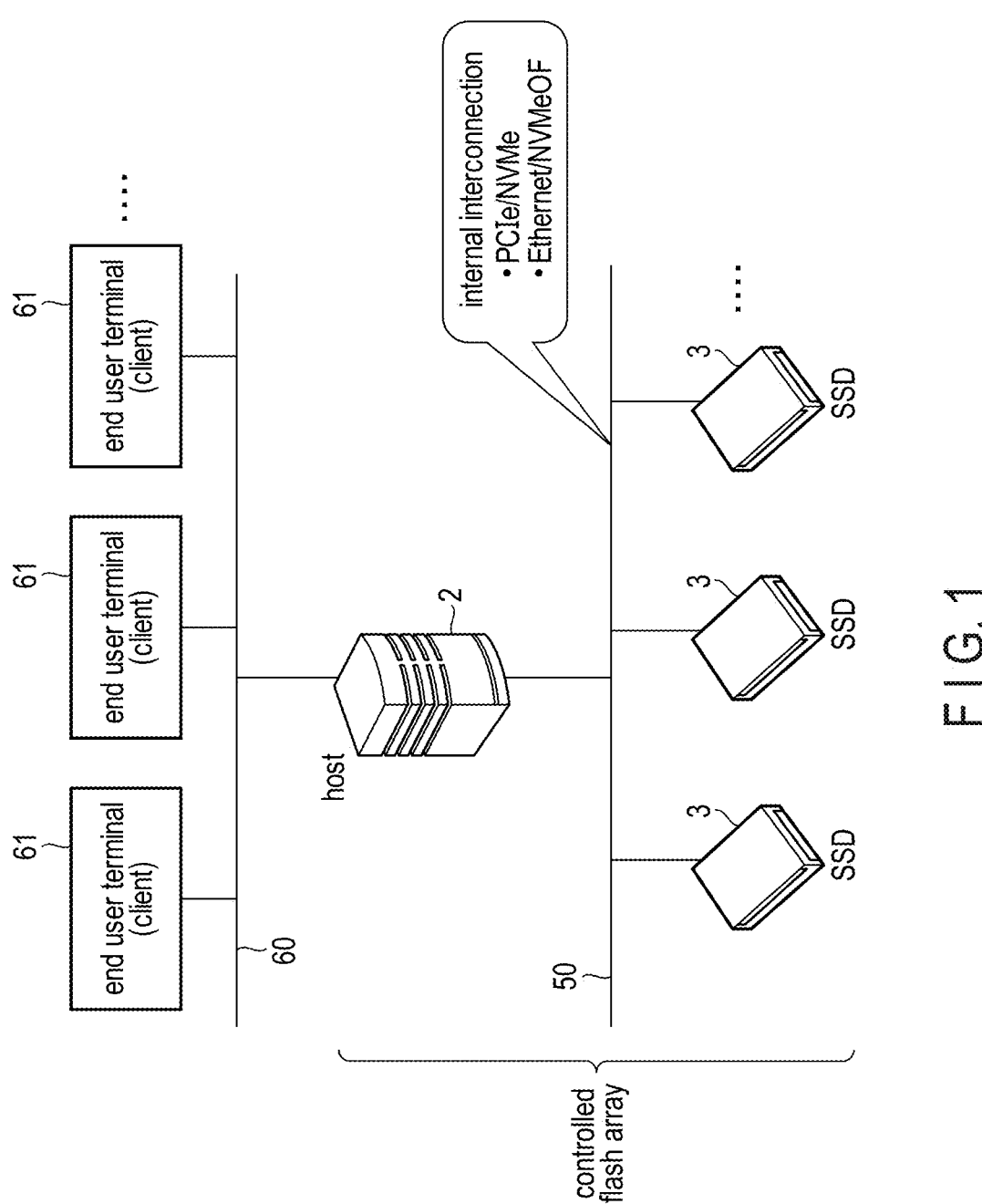
F I G. 1

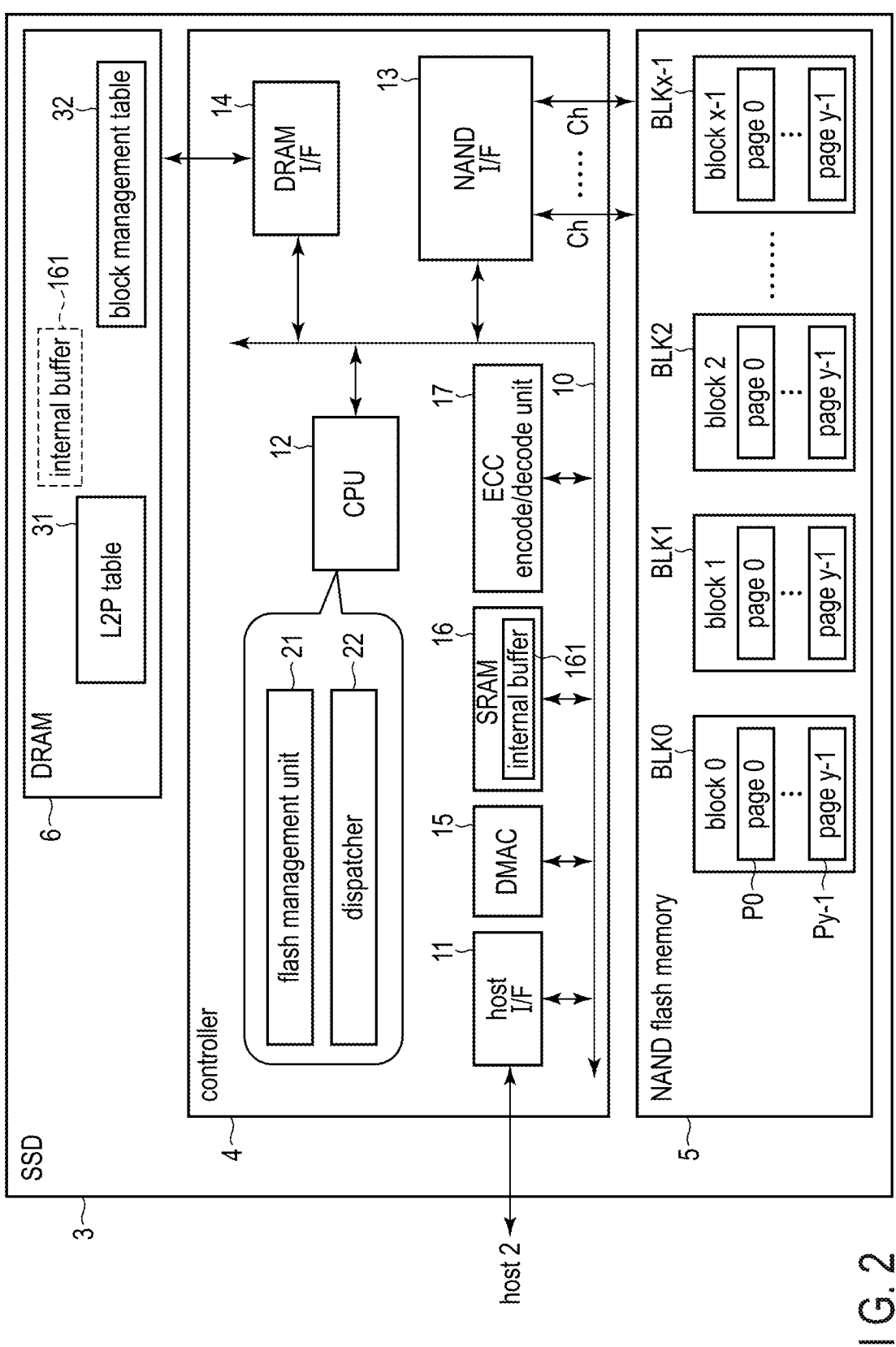
F I G. 2

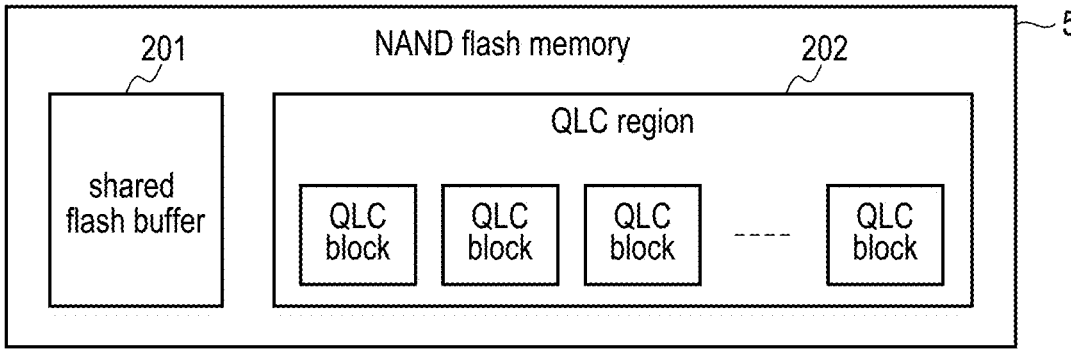
F I G. 3
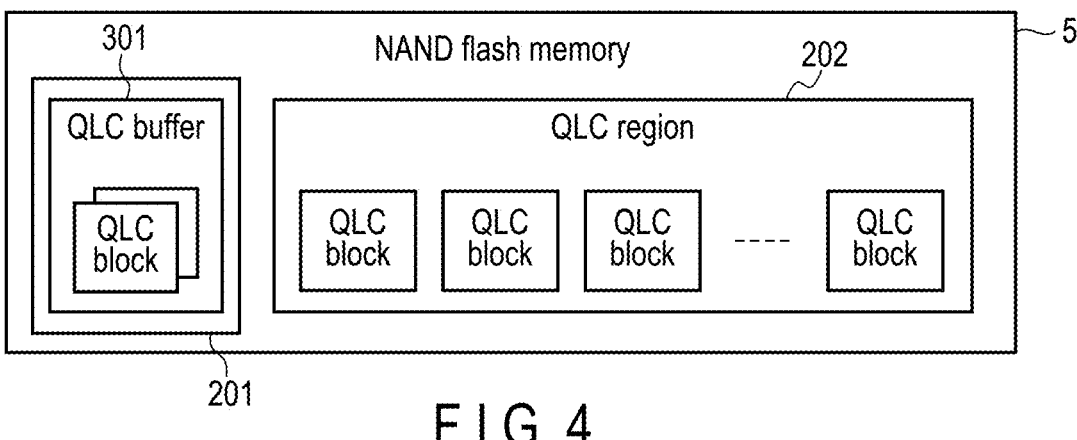
F I G. 4
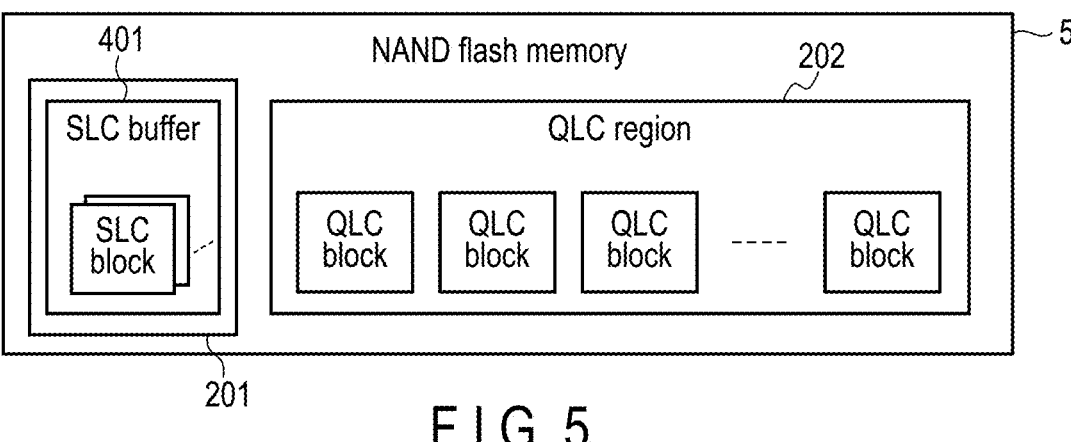
F I G. 5

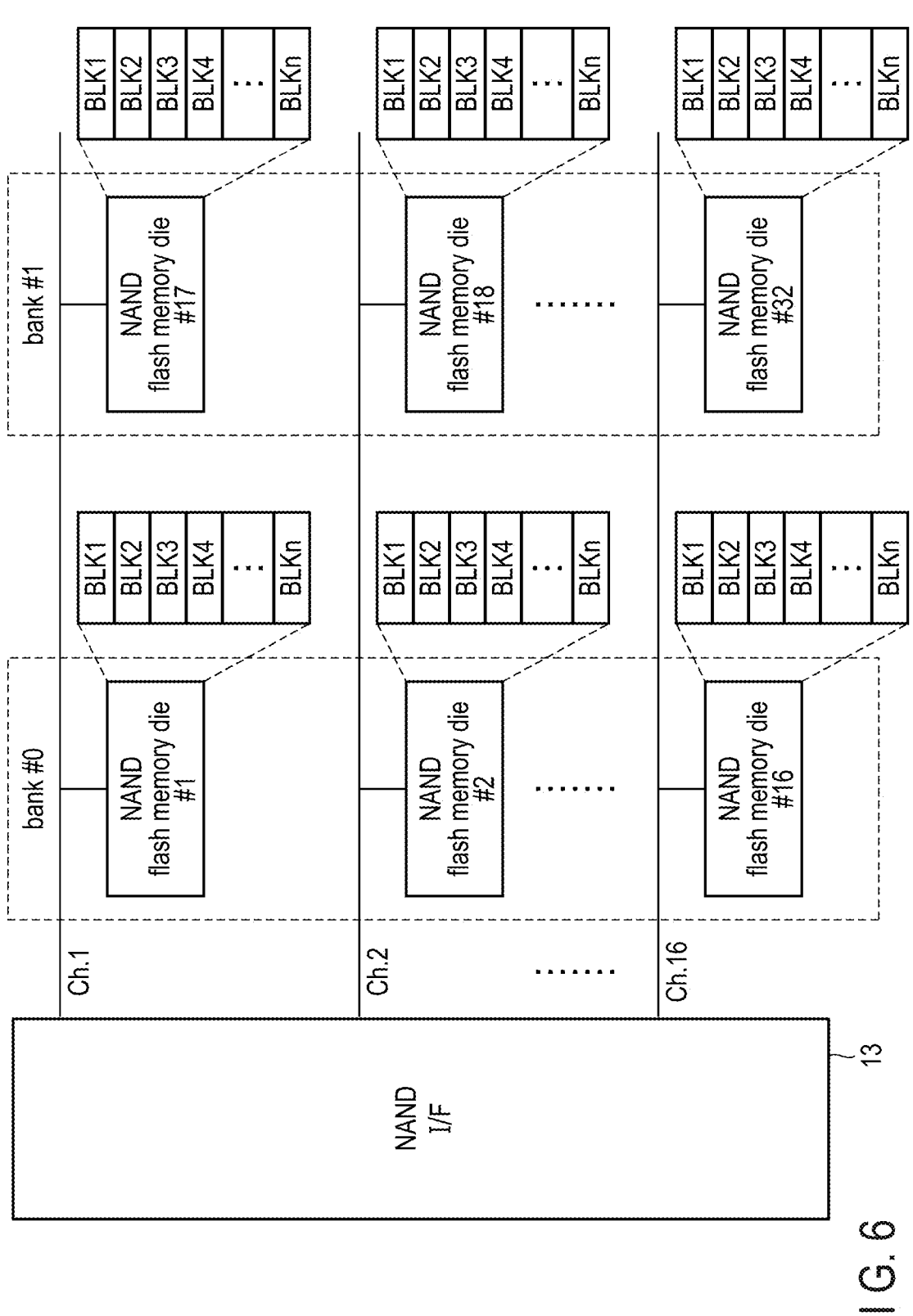
F I G. 6

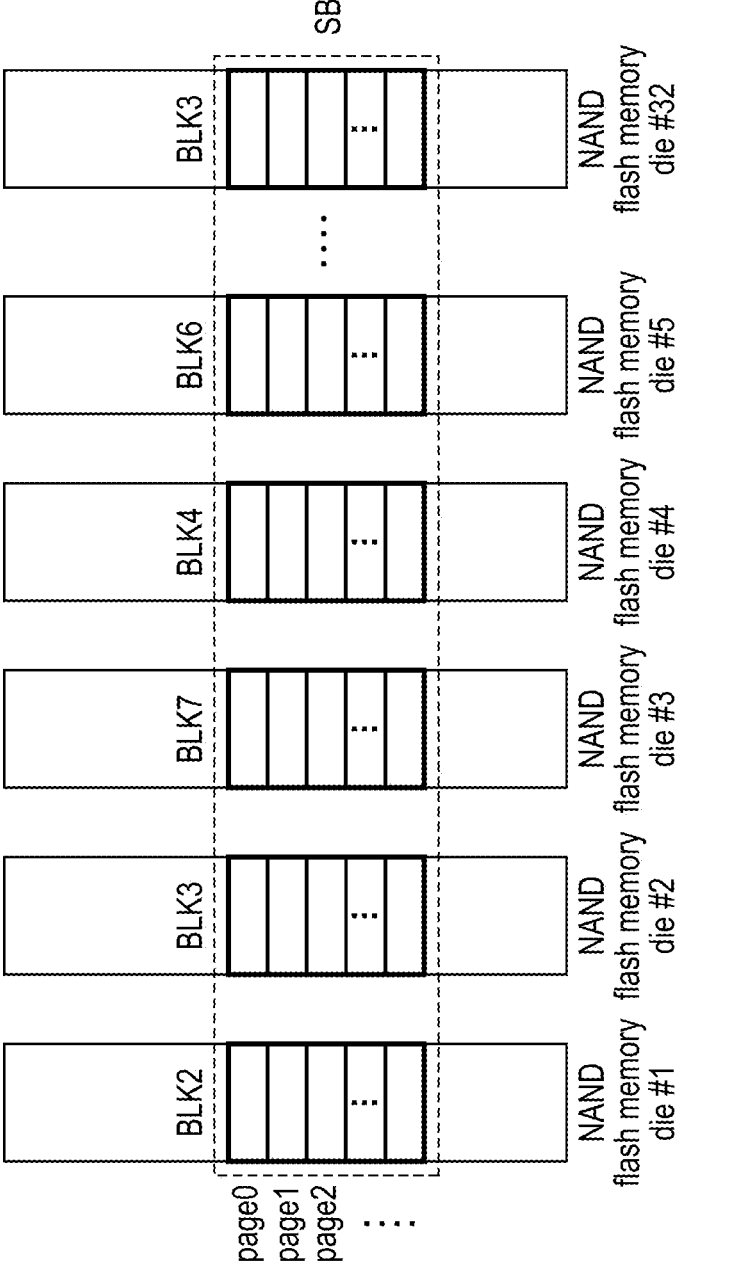
F I G. 7

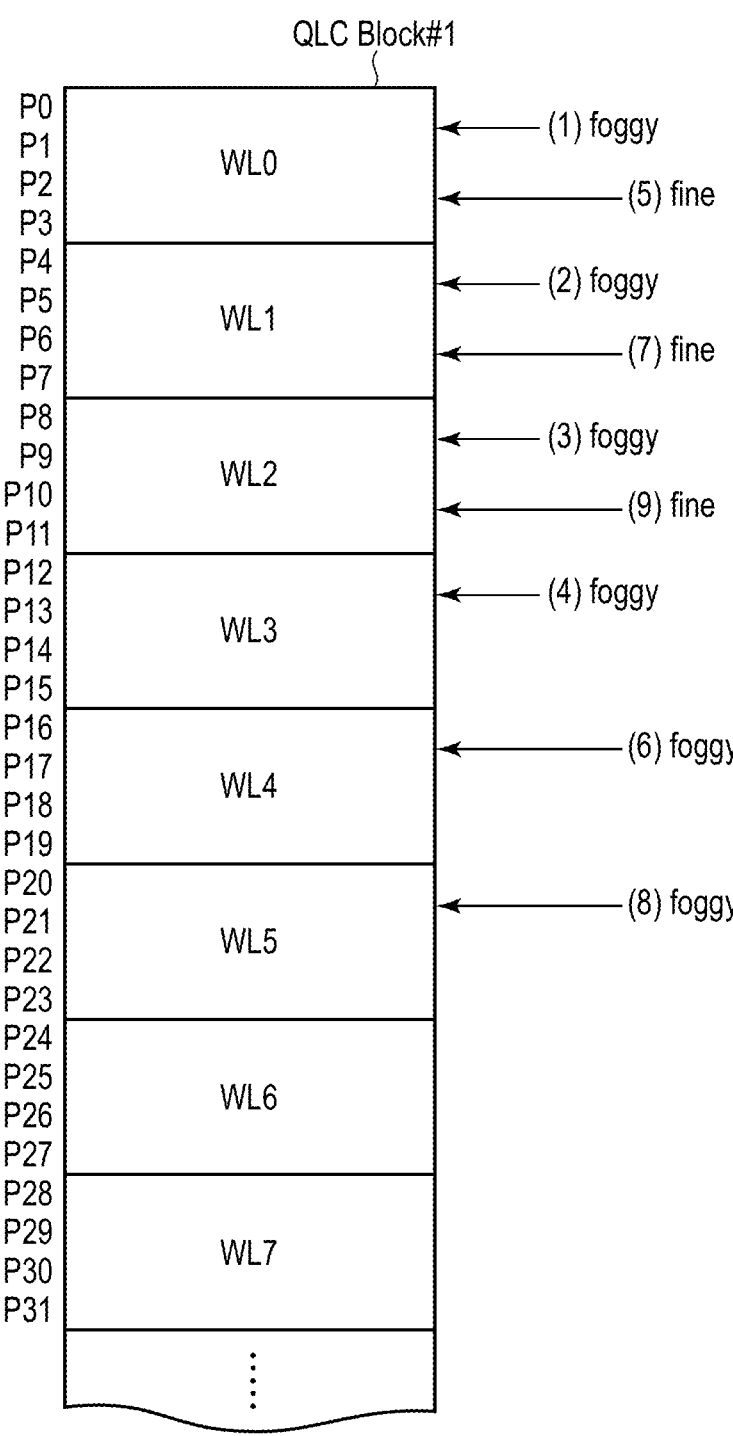
F I G. 8

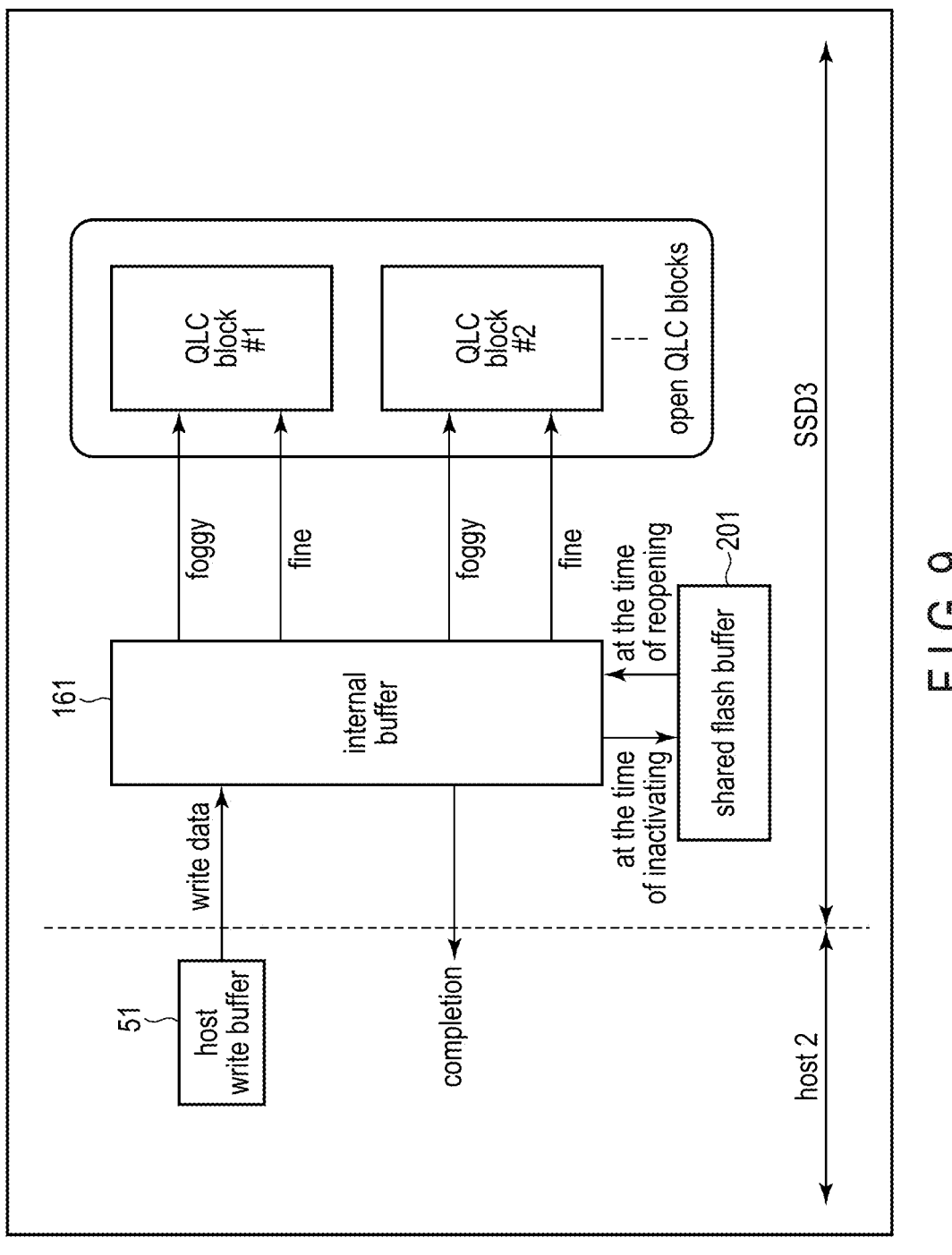
F I G. 9

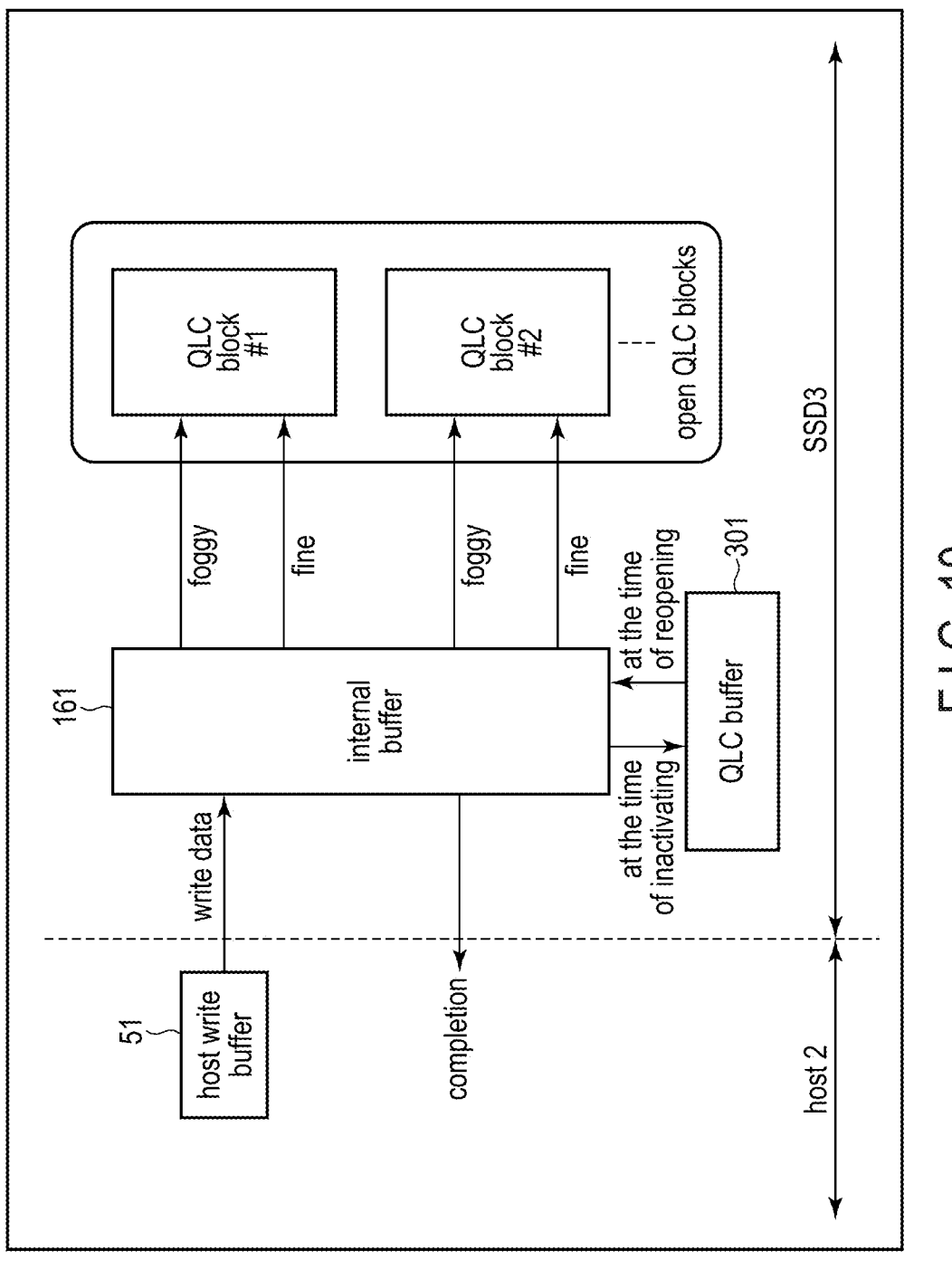
F I G. 10

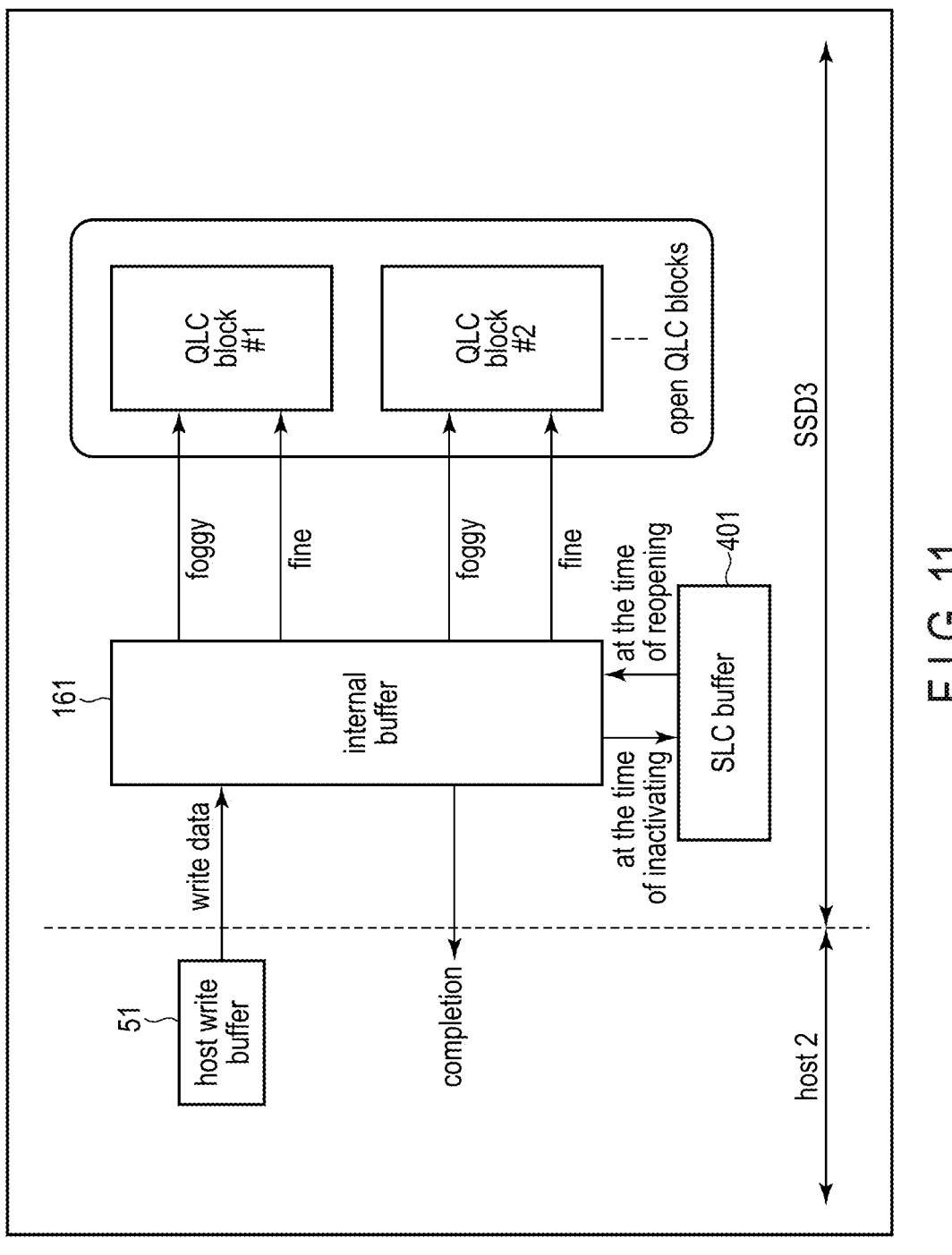
F I G. 11

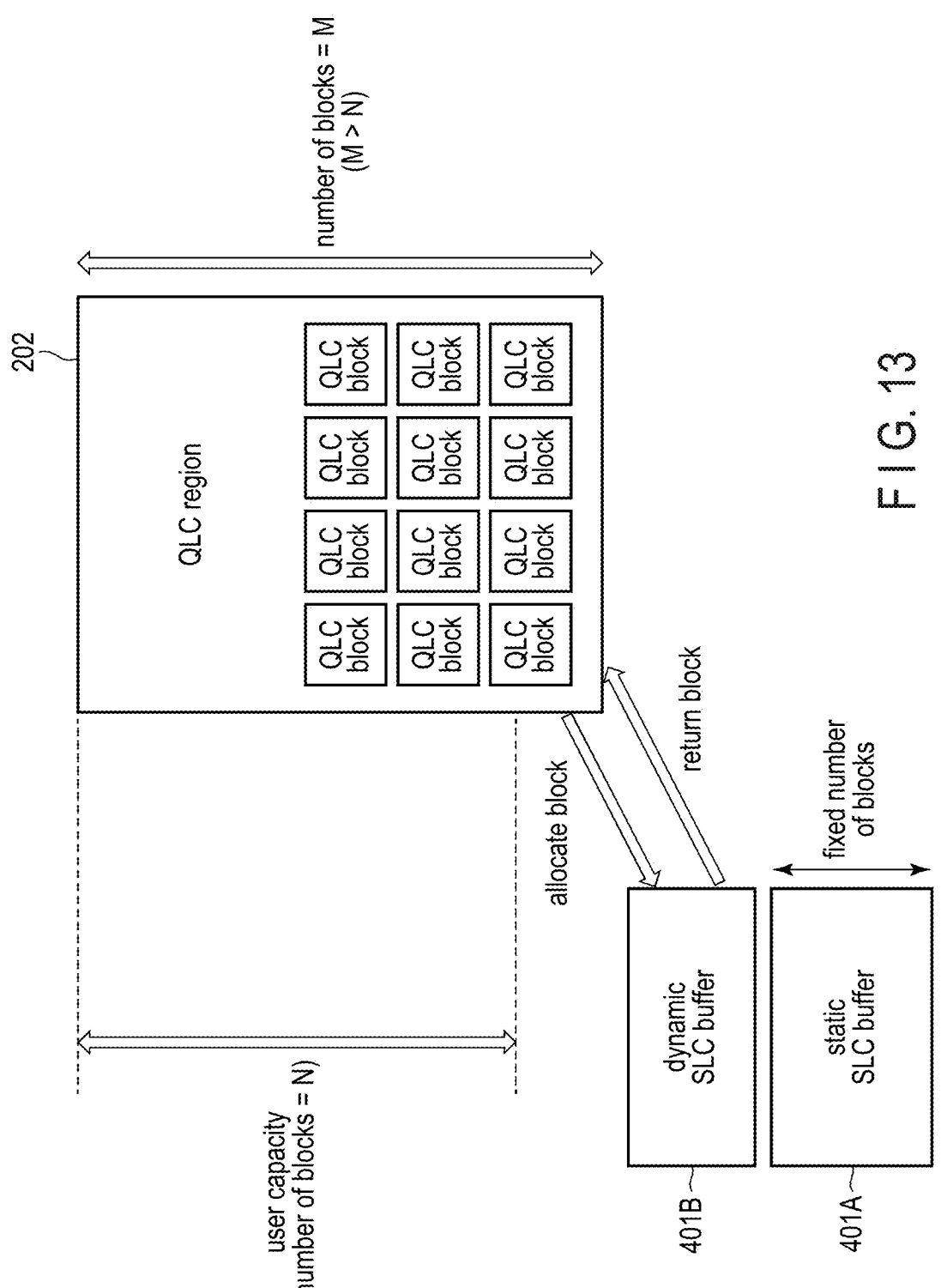
F I G. 13

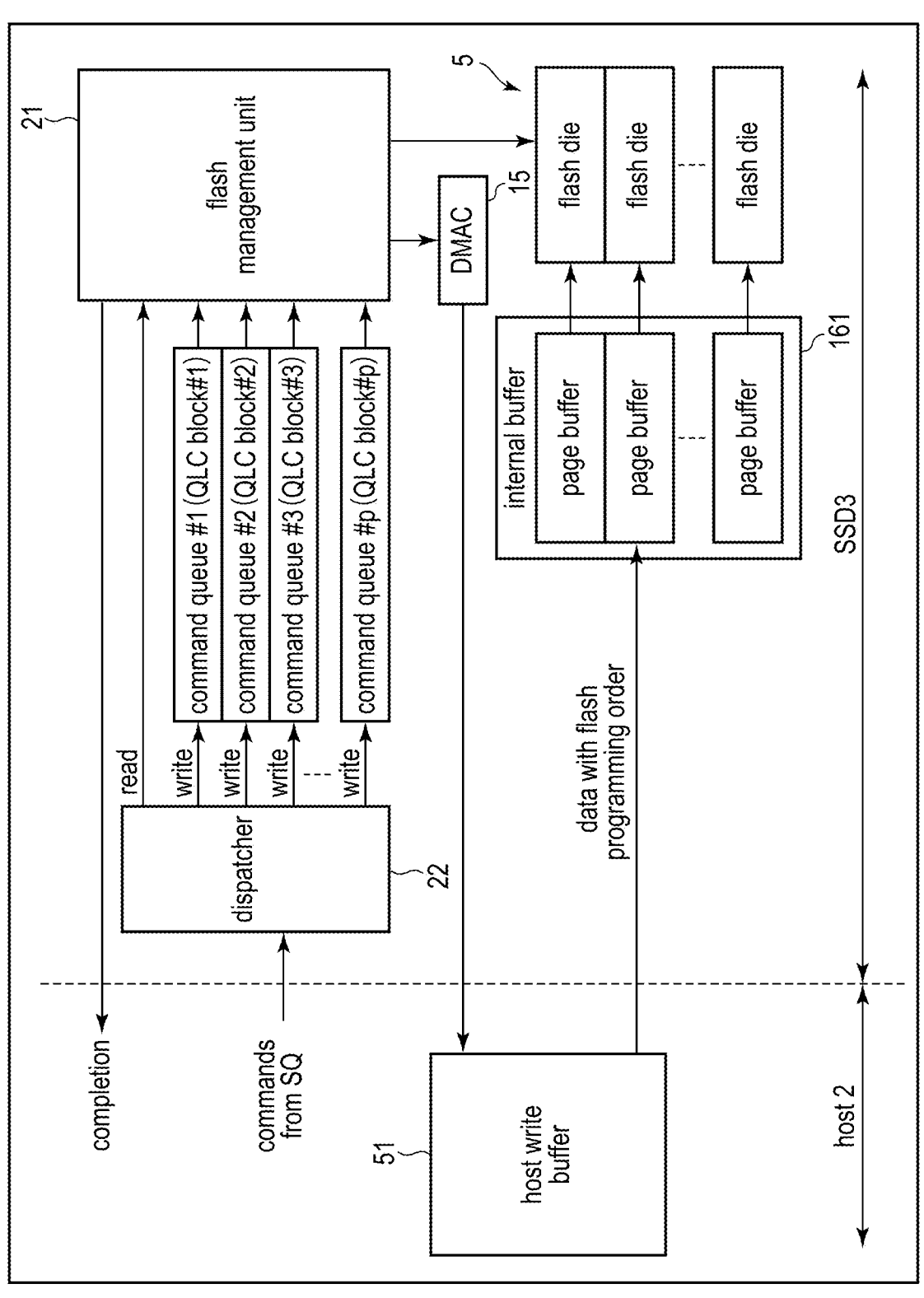
F I G. 14

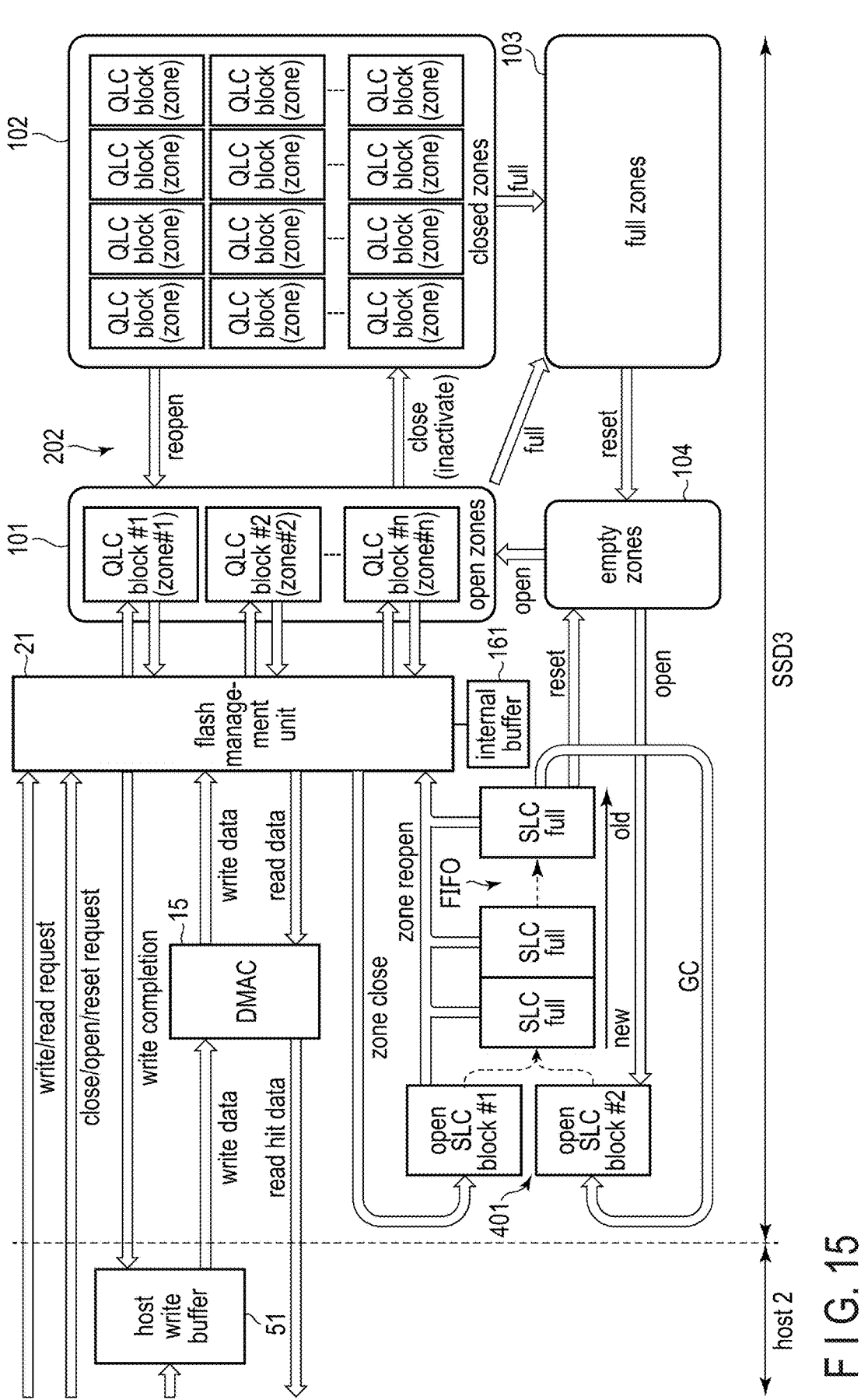
F I G. 15

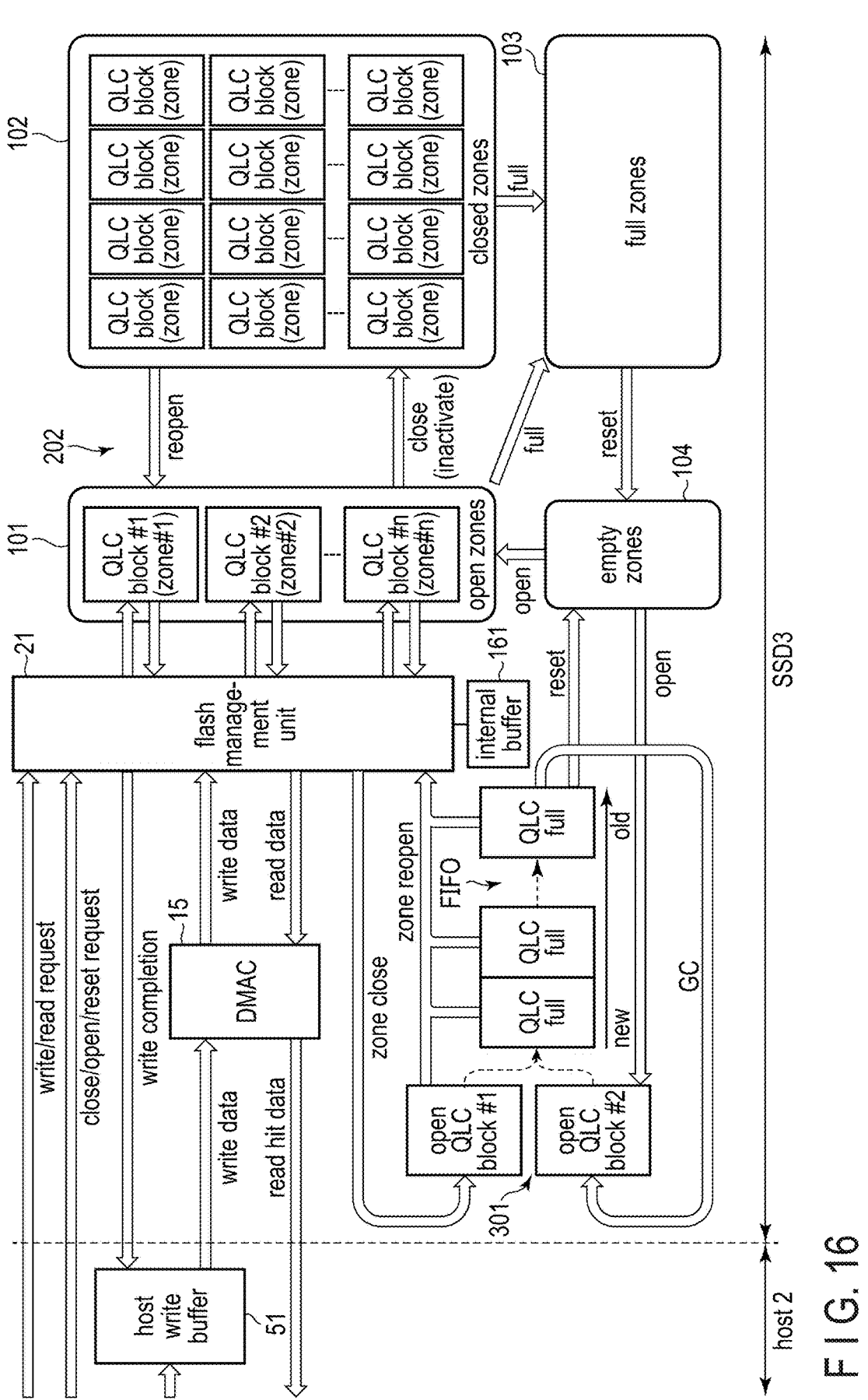
F I G. 16

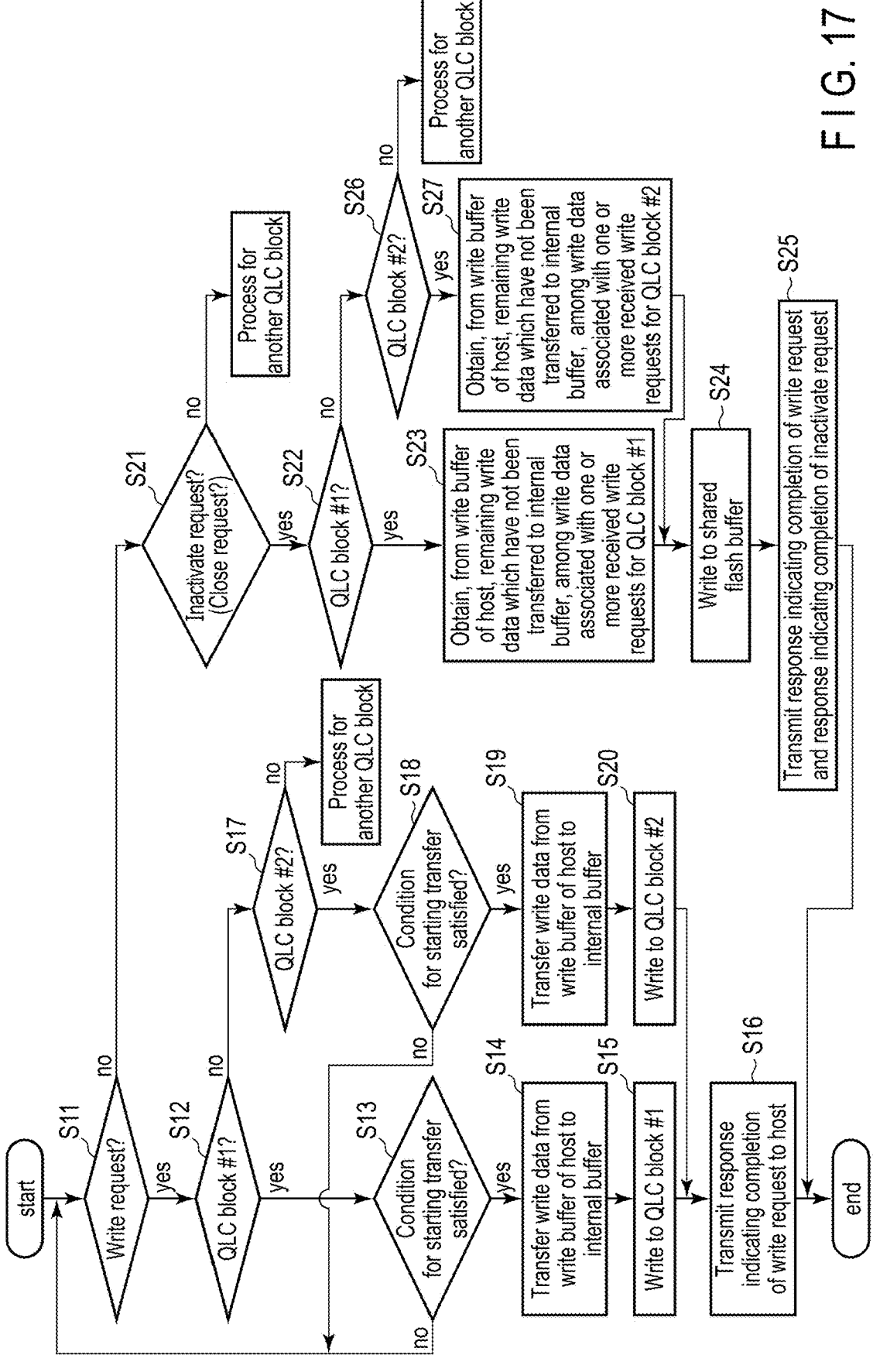
F I G. 17

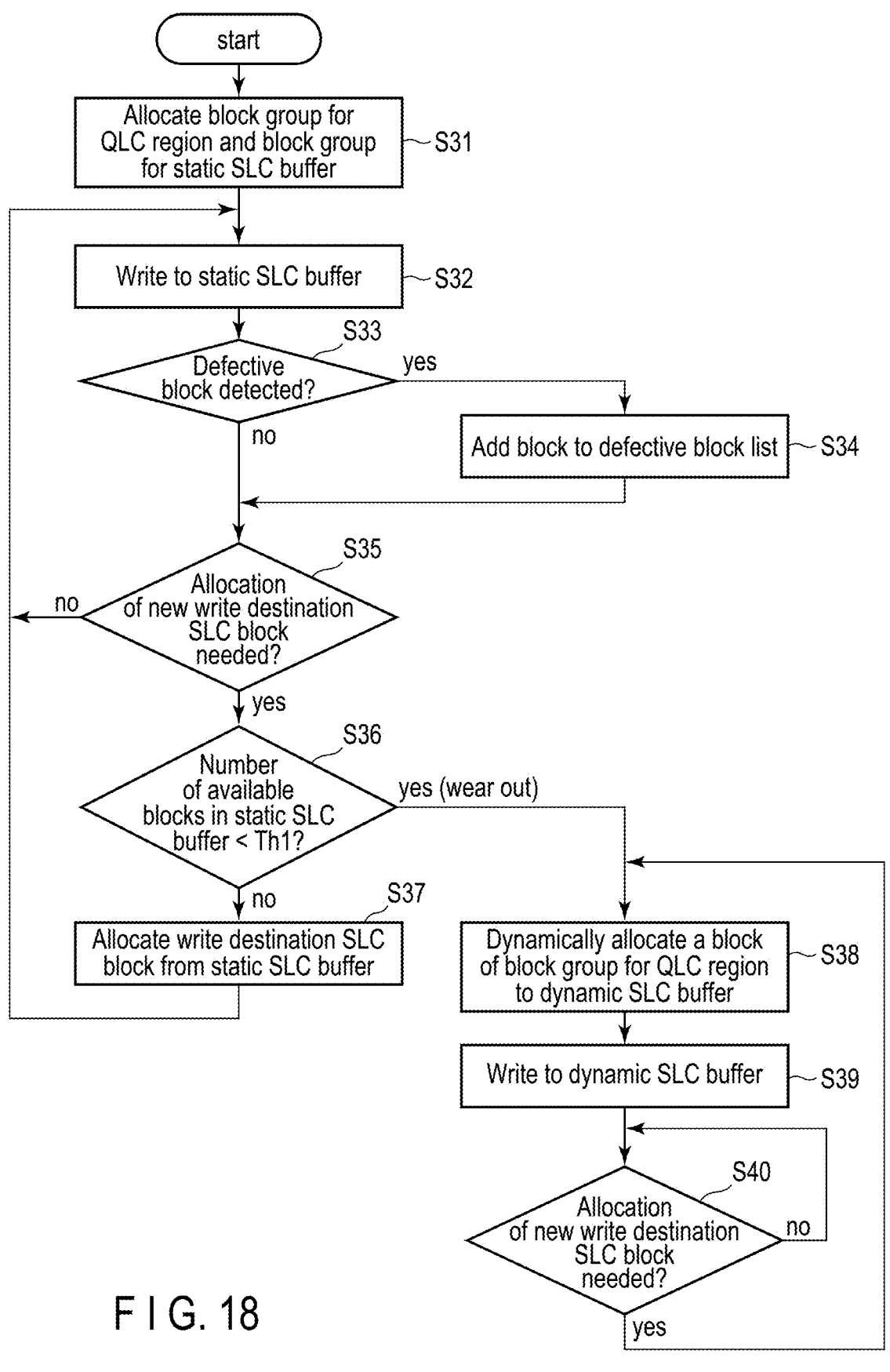
F I G. 18

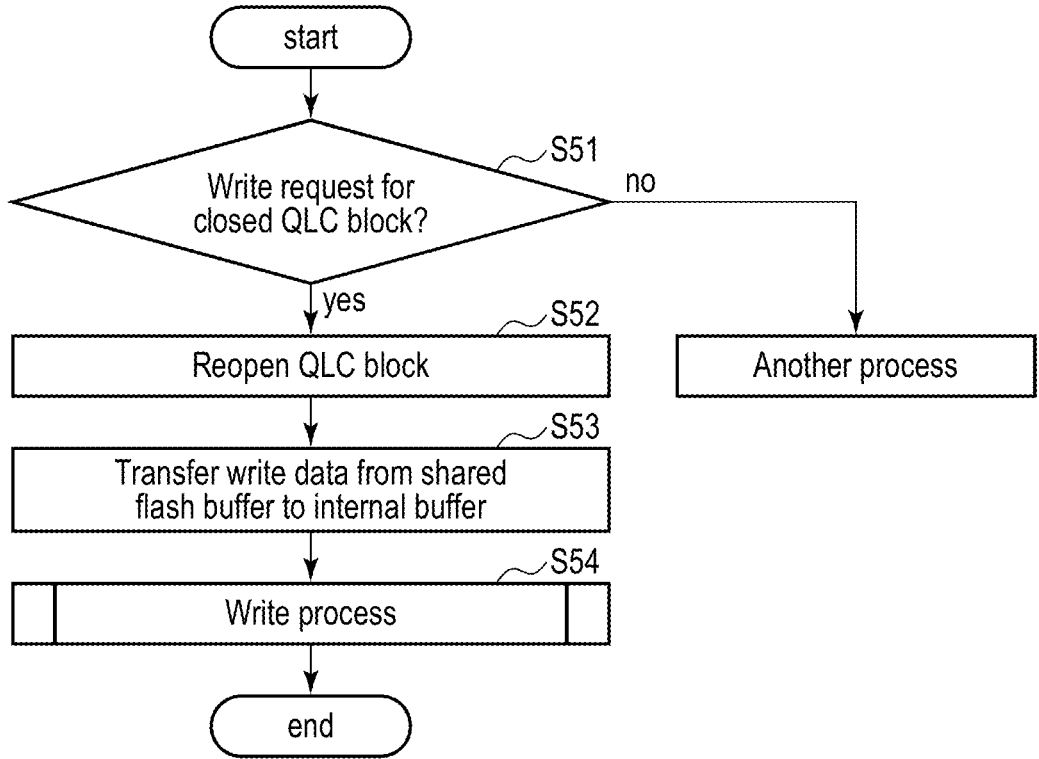
F I G. 19

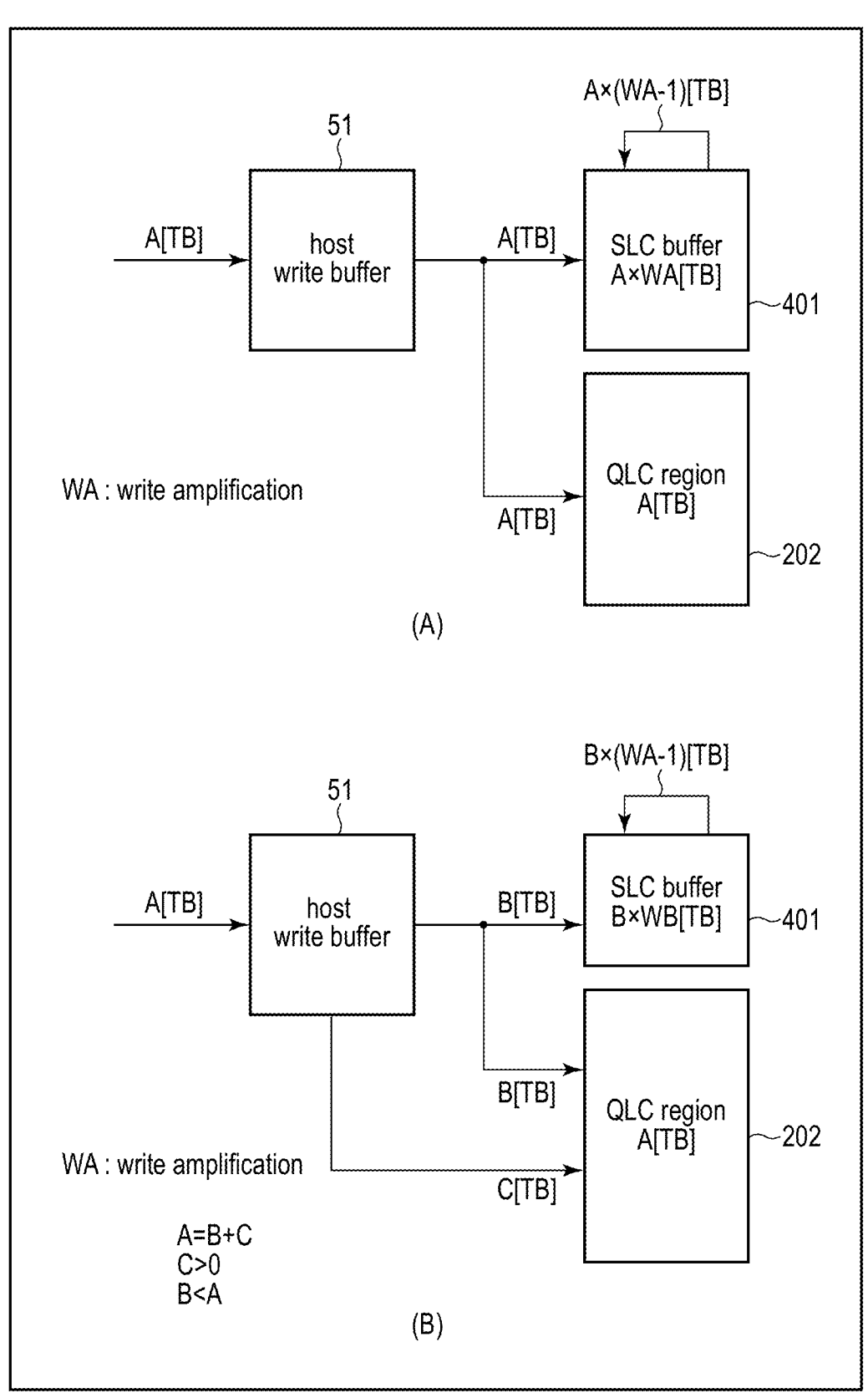
F I G. 20

MEMORY SYSTEM CONTROLLING NONVOLATILE MEMORY

CROSS-REFERENCE TO RELATED APPLICATIONS

This application is a continuation of and claims benefit under 35 U.S.C. § 120 to U.S. Application Ser. No. 18/327,108 filed Jun. 1, 2023, which is a continuation of and claims benefit under 35 U.S.C. § 120 to U.S. Application Ser. No. 17/536,558 filed Nov. 29, 2021, which is a continuation of and claims benefit under 35 U.S.C. § 120 to U.S. Application Ser. No. 17/019,955 filed Sep. 14, 2020, which is based upon and claims the benefit of priority under 35 U.S.C. § 119 from Japanese Patent Application No. 2020-005292, filed Jan. 16, 2020, the entire contents of each of which are incorporated herein by reference.

FIELD

Embodiments described herein relate generally to a technology for controlling a nonvolatile memory.

BACKGROUND

Memory systems implemented with nonvolatile memories have recently become widespread. As such memory systems, a solid state drive (SSD) implemented with a NAND flash memory has been known.

The memory systems such as the SSD are used as storage devices for various host computing systems, such as a server of a data center.

In the memory systems such as the SSD, implement of a new technology capable of effectively using storage regions of a nonvolatile memory is required.

BRIEF DESCRIPTION OF THE DRAWINGS

FIG. 1 is a block diagram illustrating a relationship between a memory system according to an embodiment and a host.

FIG. 2 is a block diagram illustrating a configuration example of the memory system according to the embodiment.

FIG. 3 is a block diagram illustrating a relationship between a plurality of quad-level cell blocks (QLC blocks) used as user data storage regions and a shared flash buffer shared by the plurality of QLC blocks.

FIG. 4 is a block diagram illustrating a QLC buffer used as the shared flash buffer.

FIG. 5 is a block diagram illustrating a single-level cell buffer (SLC buffer) used as the shared flash buffer.

FIG. 6 is a block diagram illustrating a relationship between a plurality of channels and a plurality of NAND flash memory dies used in the memory system according to the embodiment.

FIG. 7 is a diagram illustrating a configuration example of a block group (super block) used in the memory system according to the embodiment.

FIG. 8 is a diagram for explaining an operation for writing data to a QLC block in a mode for writing 4 bits per memory cell.

FIG. 9 is a diagram for explaining an operation for controlling the QLC blocks and the shared flash buffer, which is performed in the memory system according to the embodiment.

FIG. 10 is a diagram for explaining an operation for controlling a QLC buffer used as the shared flash buffer.

FIG. 11 is a diagram for explaining an operation for controlling an SLC buffer used as the shared flash buffer.

FIG. 13 is a diagram for explaining an operation for controlling the hybrid SLC buffer.

FIG. 14 is a block diagram illustrating a write operation performed in the memory system according to the embodiment.

FIG. 15 is a block diagram illustrating an example of a sequence of a write operation and a sequence of a read operation, which are performed in the memory system according to the embodiment.

FIG. 16 is a block diagram illustrating another example of the sequence of the write operation and the sequence of the read operation, which are performed in the memory system according to the embodiment.

FIG. 17 is a flowchart illustrating a procedure of a write operation performed in the memory system of the embodiment and a procedure of an operation for causing a QLC block in an opened state to transition to a closed state.

FIG. 18 is a flowchart illustrating a procedure of an operation for controlling the hybrid SLC buffer.

FIG. 19 is a flowchart illustrating a procedure of an operation for reopening a QLC block in a closed state.

FIG. 20 is a diagram for explaining a capacity of an SLC buffer required for an SSD of a comparative example and a capacity of the SLC buffer required for the memory system of the embodiment.

DETAILED DESCRIPTION

Figure 12:
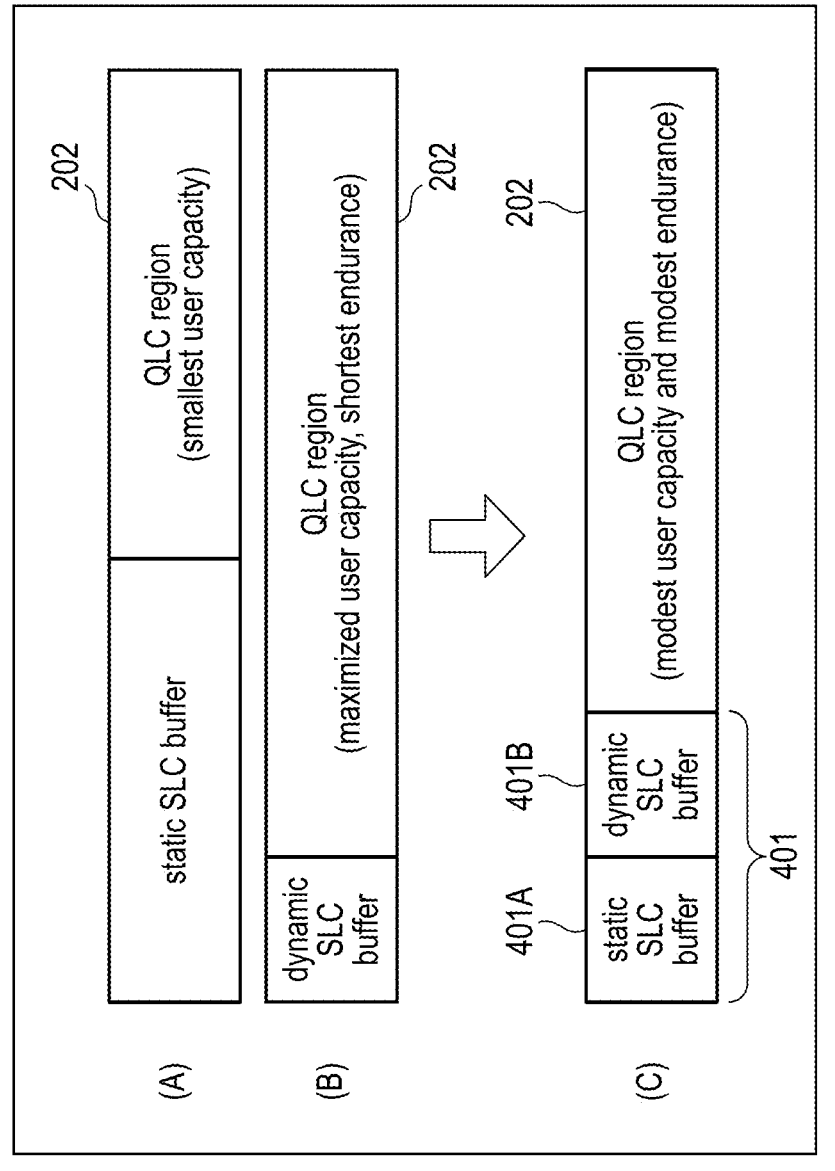
FIG. 12 is a diagram for explaining a hybrid SLC buffer using both a static SLC buffer and a dynamic SLC buffer.

Various embodiments will be described hereinafter with reference to the accompanying drawings.

In general, according to one embodiment, a memory system is connectable to a host. The memory system comprises a nonvolatile memory including a plurality of blocks, a buffer, and a controller electrically connected to the nonvolatile memory and the buffer. Each of the plurality of blocks is a unit for a data erase operation. The plurality of blocks include a plurality of first blocks and at least one second block.

The controller performs a first operation a plurality of times for each of the plurality of first blocks. The first operation includes a write operation for writing data in a first write mode for writing m-bit data per memory cell and a data erase operation.

While the second block is not a defective block, the controller performs a second operation a plurality of times for the second block. The second operation includes a write operation for writing data in a second write mode for writing n-bit data per memory cell and a data erase operation. Here, m is an integer greater than or equal to two, and n is an integer greater than or equal to one and less than or equal to m.

The write operation of the second operation includes an operation for writing, in response to receiving a first request from the host, first write data to the second block, the first write data being data among write data associated with one or more write requests received from the host for one first block of the plurality of first blocks and having not been transferred to the buffer, the first request being a request for causing a state of the one first block to transition from a first state of being allocated as a write destination block in which writing of data is possible to a second state in which writing of data is suspended.

When the second block is a defective block, in response to receiving a second request from the host, the controller selects a first block from the plurality of first blocks, and writes second write data to the selected first block in the second write mode, the second write data being data among write data associated with one or more write requests received from the host for one first block of the plurality of first blocks and having not been transferred to the buffer, the second request being a request for causing a state of the one first block to transition from the first state to the second state.

FIG. 1 is a block diagram illustrating a relationship between a memory system according to an embodiment and a host.

The memory system is a semiconductor storage device configured to write data to a nonvolatile memory and read data from the nonvolatile memory. The memory system may be realized as a solid state drive (SSD) 3 including a NAND flash memory.

The host (host device) 2 is configured to control a plurality of SSDs 3. The host 2 may be realized as an information processing apparatus configured to use a storage array including the SSDs 3 as storage. The information processing apparatus may be a personal computer or a server computer.

Each SSD 3 may be used as one of a plurality of storage devices provided in the storage array. The storage array may be connected to the information processing apparatus such as a server computer via a cable or a network. The storage array may include a controller which controls the plurality of storage devices (for example, the plurality of SSDs) in the storage array. When the SSD 3 is applied to the storage array, the controller of the storage array may function as the host for the SSD 3.

Hereinafter, an example of a case where the information processing apparatus such as a server computer functions as the host 2 will be described.

The host (server) 2 and the plurality of SSDs 3 are interconnected via an interface 50. PCI Express (PCIe) (registered trademark), NVM Express (NVMe) (registered trademark), Ethernet (registered trademark) or NVMe over Fabrics (NVMeOF) may be used as standards for the interface 50 for the interconnection. However, the interface 50 is not limited to these examples.

An example of the server computer which functions as the host 2 is a server computer in a data center (hereinafter, referred to as a server).

In a case where the host 2 is realized as the server in the data center, the host (server) 2 may be connected to a plurality of end user terminals (clients) 61 via a network 60. The host 2 can provide the end user terminals 61 with various services.

Examples of the services which can be provided by the host (server) 2 include, for example, (1) a Platform as a Service (PaaS) which provides each client (end user terminal 61) with a system running platform and (2) Infrastructure as a Service (IaaS) which provides each client (end user terminal 61) with infrastructure such as a virtual server.

A plurality of virtual machines may be executed on a physical server which functions as the host (server) 2. Each of the virtual machines running on the host 2 may function as a virtual server configured to provide a client (end user terminal 61) corresponding to the virtual machine with various services. In each virtual machine, an operating system and a user application which are used by a corresponding end user terminal 61 are executed. An operating system corresponding to each virtual machine includes an I/O service. The I/O service may be a block I/O service based on a logical block address (LBA) or a key-value store service.

In an operating system corresponding to each virtual machine, the I/O service issues I/O commands (e.g., a write command and a read command) in response to a request of write/read from the user application. The I/O commands are transmitted to the SSD 3 via one or more submission queues in the host 2.

The controller of the SSD 3 is configured to write data received from the host 2 to a nonvolatile memory, selectively using a first write mode for writing m-bit data per memory cell and a second write mode for writing n-bit data per memory cell. Here, m is an integer greater than or equal to 2, and n is an integer greater than or equal to 1 and less than or equal to m. In some embodiments, n may be an integer greater than or equal to 1 and less than m.

More specifically, the controller of each SSD 3 writes data to each of a plurality of first storage regions included in the nonvolatile memory in the first write mode for writing m-bit data per memory cell, and writes data to each of a second storage region included in the nonvolatile memory in the second write mode for writing n-bit data per memory cell.

The first storage regions are used as user data storage regions for storing user data. The second storage region is used to temporarily and non-volatilely store data to be written to the first storage regions, as needed. The second storage region is shared by the first storage regions. The data which should be written to any first storage region are non-volatilely stored in the second storage region.

FIG. 2 illustrates a configuration example of the SSD 3.

The SSD 3 includes a controller 4 and a nonvolatile memory (for example, a NAND flash memory 5). The SSD 3 may further include a random access memory, for example, a DRAM 6.

The NAND flash memory 5 includes a memory cell array including a plurality of memory cells arranged in matrix. The NAND flash memory 5 may be either a NAND flash memory having a two-dimensional structure or a NAND flash memory having a three-dimensional structure.

The memory cell array of the NAND flash memory 5 includes a plurality of blocks BLK0 to BLKx−1. Each of the blocks BLK0 to BLKx−1 includes a plurality of pages (here, pages P0 to Py−1). Each of the blocks BK0 to BLKx−1 is a unit for a data erase operation of erasing data. The data erase operation may also be referred to as an erase operation. The blocks may be called erase blocks, physical blocks or physical erase blocks. Each of the pages P0 to Py−1 is a unit for a data write operation of writing data and a data read operation of reading data.

The controller 4 is electrically connected to the NAND flash memory 5, which is a nonvolatile memory, via a NAND interface 13 that conforms to standards such as a Toggle NAND flash interface or open NAND flash interface (ONFI). The controller 4 operates as a memory controller configured to control the NAND flash memory 5. The controller 4 may be a circuit such as a system-on-a-chip (SoC).

As shown in FIG. 3, the storage regions of the NAND flash memory 5 are generally classified into a shared flash buffer 201 and a quad-level cell region (QLC region) 202.

The QLC region 202 includes a plurality of QLC blocks. Each of the plurality of QLC blocks is a block to which data are written in a write mode (program mode) for storing 4 bits per memory cell. The plurality of QLC blocks included in the QLC region 202 are examples of the plurality of first storage regions.

In an operation for writing data to each QLC block, data of four pages are written to a plurality of memory cells connected to the same word line by writing data of 4 bits per memory cell.

The shared flash buffer 201 is an example of the second storage region and is used as a nonvolatile buffer shared by the plurality of QLC blocks included in the QLC region 202.

As shown in FIG. 4, the shared flash buffer 201 may be realized as a QLC buffer 301. The QLC buffer 301 of FIG. 4 includes a plurality of blocks (a plurality of QLC blocks). In an operation for writing data to each QLC block included in the shared flash buffer 201, data of four pages are written to a plurality of memory cells connected to the same word line by writing data of 4 bits per memory cell.

Alternatively, as shown in FIG. 5, the shared flash buffer 201 may be realized as a single-level cell buffer (SLC buffer) 401. The SLC buffer 401 of FIG. 5 includes a plurality of blocks (a plurality of SLC blocks). In an operation for writing data to each SLC block, data of only 1 page are written to a plurality of memory cells connected to the same word line by writing data of 1 bit per memory cell (SLC mode).

The storage density per memory cell in each SLC block is 1 bit (in other words, one page per word line). The storage density per memory cell in each QLC block is 4 bits (in other words, four pages per word line).

The write speed and read speed of data to and from the NAND flash memory 5 decreases with increasing storage density, and increases with decreasing storage density. Thus, the time required for the data read and data write for each QLC block is longer than the time required for the data read and data write for each SLC block.

For the first write mode applied to the QLC region 202, a foggy-fine write operation may be used. The foggy-fine write operation is an example of a write mode in which data written in one page of the pages included in a block become readable from the one page after data are written to one or more pages subsequent to the one page.

The foggy-fine write operation is performed by multi-step write operations, which include a first-step write operation (a foggy write operation) and a second-step write operation (a fine write operation), for memory cells connected to the same word line. The first-step write operation (foggy write operation) is a write operation for roughly setting a threshold voltage of each memory cell. The second-step write operation (fine write operation) is a write operation for adjusting the threshold voltage of each memory cell. The foggy-fine write operation is a write mode which can reduce an influence caused by program disturb.

In the first-step write operation (foggy write operation), firstly, data of four pages are transferred in a unit of a page to the NAND flash memory 5 by a first data transfer operation. For example, when the data size per page (page size) is 16 KB, data of 64 KB are transferred in a unit of the page size to the NAND flash memory 5. Subsequently, a first program operation for programming the data of four pages to the memory cell array of the NAND flash memory 5 is performed.

In the second-step write operation (fine write operation), in a manner similar to that of the foggy write operation, data of four pages are transferred in a unit of the page size again to the NAND flash memory 5 by a second data transfer operation. The data transferred to the NAND flash memory 5 by the second data transfer operation are the same as the data transferred by the first data transfer operation. Subsequently, a second program operation for programming the transferred data of four pages to the memory cell array of the NAND flash memory 5 is performed.

Even if the foggy write operation for memory cells connected to one word line is finished, the fine write operation for the memory cells connected to this one word line cannot be immediately performed. The fine write operation for the memory cells connected to this one word line can be performed after the foggy write operation for memory cells connected to each of one or more word lines subsequent to this one word lines is finished. Thus, the time required to write data to each QLC block is long. Data written in memory cells connected to one word line of a QLC block by the foggy write operation cannot be read until the foggy write operation for memory cells connected to each of one or more word lines subsequent to the one word line is finished and further the fine write operation for the memory cells connected to this one word line is finished.

In a case where the shared flash buffer 201 is realized as the QLC buffer 301 as shown in FIG. 4, writing in each QLC block included in the QLC buffer 301 may be also performed by the foggy-fine write operation.

In a case where the shared flash buffer 201 is realized as the SLC buffer 401 as shown in FIG. 5, the SLC mode is used as the second write mode applied to the shared flash buffer 201. The SLC mode is a write mode in which data written in one page of the pages included in a block become readable by writing data only to this one page.

Another example of the write mode in which data written in one page of the pages included in a block become readable by writing data only to this one page is a mode in which data of 2 bits is written per memory cell (MLC Lower-Middle (LM) mode). The MLC LM mode may be used as the second write mode applied to the shared flash buffer 201.

As shown in FIG. 6, the NAND flash memory 5 may include a plurality of NAND flash memory dies. Each NAND flash memory die is independently operable. Thus, each of the NAND flash memory dies functions as a unit for a parallel operation. FIG. 6 illustrates a case where sixteen channels Ch. 1 to Ch. 16 are connected to the NAND interface 13, and two NAND flash memory dies are connected to each of the sixteen channels Ch. 1 to Ch. 16. In this case, sixteen NAND flash memory dies #1 to #16 connected to channels Ch. 1 to Ch. 16 may be grouped as bank #0. The remaining sixteen NAND flash memory dies #17 to #32 connected to channels Ch. 1 to Ch. 16 may be grouped as bank #1. Each of the banks functions as a unit to cause a plurality of memory modules (memory dies) to operate in parallel by bank interleaving. In the configuration example of FIG. 6, up to thirty-two NAND flash memory dies can be operated in parallel by sixteen channels and bank interleaving using two banks.

An erase operation may be performed in a unit of a block (physical block) or in a unit of a block group including a set of physical blocks which are operable in parallel. The block group is also referred to as a super block.

One block group, in other words, one super block including a set of physical blocks, may include thirty-two physical blocks selected from NAND flash memory dies #1 to #32, respectively. However, the block group is not limited to this example. Each of NAND flash memory dies #1 to #32 may have a multiplane structure. For example, in a case where each of NAND flash memory dies #1 to #32 has a multiplane structure including two planes, each super block may include sixty-four physical blocks BLK in total selected from each of sixty-four planes of NAND flash memory dies #1 to #32.

FIG. 7 illustrates a super block SB including thirty-two physical blocks. Here, the super block SB includes physical block BLK2 of NAND flash memory die #1, physical block BLK3 of NAND flash memory die #2, physical block BLK7 of NAND flash memory die #3, physical block BLK4 of NAND flash memory die #4, physical block BLK6 of NAND flash memory die #5, . . . and physical block BLK3 of NAND flash memory die #32.

Each QLC block in the QLC region 202 explained in FIG. 3 may be realized with one super block (QLC super block) or may be realized with one physical block (QLC physical block). Note that each super block may include only one physical block. In this case, each superblock is equivalent to one physical block.

Each block included in the shared flash buffer 201 may also be one physical block or one super block including a set of physical blocks.

As described above, the plurality of first storage regions (for example, QLC blocks) are used as the user data storage regions for storing data (user data) written by the host 2. The plurality of first storage regions may be used as a plurality of zones of Zoned Namespaces (ZNS) defined in NVMe specification, although the first storage regions are not limited to this example. In a case where the first storage regions are used as the zones of Zoned Namespaces, a logical address space used by the host 2 to access the SSD 3 is divided into a plurality of logical address ranges. The plurality of logical address ranges are assigned to the plurality of first storage regions, respectively.

Next, a configuration of the controller 4 illustrated in FIG. 2 will be described.

The controller 4 may function as a flash translation layer (FTL) configured to perform data management of the NAND flash memory 5 and block management of the NAND flash memory 5. The data management performed by the FTL includes (1) management of mapping information indicative of a correspondence between each of logical addresses and each of physical addresses of the NAND flash memory 5, (2) a process for concealing restrictions of the NAND flash memory 5 (for example, read/write operations in a page unit and an erase operation in a block unit), etc. The logical addresses are used by the host 2 to specify a logical address in the logical address space of the SSD 3. For the logical addresses, logical block addresses (addressing) (LBAs) may be used.

The mapping between each of the logical addresses used by the host 2 to access the SSD 3 and each of the physical addresses of the NAND flash memory 5 is managed using an address translation table (logical-to-physical address translation table: L2P table) 31. The controller 4 may manage the mapping between each of the logical addresses and each of the physical addresses in a unit of a predetermined management size, using the L2P table 31. A physical address corresponding to a logical address is indicative of the latest physical storage location in the NAND flash memory 5 in which data corresponding to the logical address are written. The L2P table 31 may be loaded from the NAND flash memory 5 into the DRAM 6 when the SSD 3 is powered on.

In the NAND flash memory 5, writing of data to each page in a block can be performed only once per erase cycle (program/erase cycle). In other words, new data cannot be written directly to a region in a block in which data are already written. Thus, to update the already written data, the controller 4 writes new data to an unwritten region in the block (or in another block), and treats the previous data as invalid data. In other words, the controller 4 writes update data corresponding to a logical address to another physical storage location different from the physical storage location in which previous data corresponding to the logical address are stored. Subsequently, the controller 4 updates the L2P table 31 to associate the logical address with said another physical storage location, and invalidates the previous data.

The block management includes management of defective blocks, wear leveling, garbage collection (GC), etc. The wear leveling is an operation for leveling the numbers of rewrites of each of the blocks (i.e., the numbers of program/erase cycles of each of the blocks).

The GC is an operation for increasing the number of free blocks. The free block means a block including no valid data. In the GC, the controller 4 copies valid data in several blocks each of which includes both valid data and invalid data to another block (for example, a free block). Here, valid data means data associated with a logical address. For example, data referred to from the L2P table 31 (in other words, data associated with a logical address as the latest data) is valid data, and may be read by the host 2 later. Invalid data means data which is not associated with any logical address. The data which is not associated with any logical address is data which will not be read by the host 2 anymore. The controller 4 updates the L2P table 31, and maps the logical addresses of the copied valid data to the physical addresses of the copy destination, respectively. Each block including only invalid data after valid data has been copied to another block is released as a free block. In this way, these blocks become available again for writing of data after an erase operation for each of these blocks is performed.

The controller 4 includes a host interface (I/F) 11, a CPU 12, the NAND interface (I/F) 13, a DRAM interface (I/F) 14, a direct memory access controller (DMAC) 15, a static RAM (SRAM) 16, and an ECC encode/decode unit 17. The host interface 11, the CPU 12, the NAND interface 13, the DRAM interface 14, the DMAC 15, the SRAM 16 and the ECC encode/decode unit 17 are interconnected via a bus 10.

The host interface 11 is a host interface circuit configured to perform communication with the host 2. The host interface 11 may be, for example, a PCIe controller (or an NVMe controller). Alternatively, in a structure in which the SSD 3 is connected to the host 2 via Ethernet (registered trademark), the host interface 11 may be an NVMe over Fabrics (NVMeOF) controller.

The host interface 11 receives various commands from the host 2. These commands may include a write command, a read command, an inactivate command, an allocate command, and a deallocate command.

A write command is a command for writing user data (write data) to the NAND flash memory 5. The write command may also be referred as a write request. The write command includes, for example, the logical address (starting LBA) of the write data, the size of the write data, and a data pointer (buffer address) indicative of a location in a write buffer of the host 2 in which the write data are stored.

The SSD 3 may be realized as a first type SSD which supports Zoned Namespaces. In the first type SSD, upper bits of the logical address included in the write command may be used as an identifier which specifies a write destination storage region (write destination QLC block) to which write data associated with the write command should be written.

Alternatively, the SSD 3 may be realized as a second type SSD which supports stream write. In the second type SSD, a stream ID included in the write command may be used as an identifier which specifies a write destination storage region (write destination QLC block) to which write data associated with the write command should be written.

The SSD 3 may be realized as a third type SSD in which the controller 4 determines the write destination storage region (write destination QLC block) and the write destination location (write destination page) in the write destination storage region and notifies the host 2 of the determined write destination storage region and the determined write destination location.

In the third type SSD, the controller 4 receives a block allocate request which specifies an ID such as a quality-of-service domain ID (QOS domain ID) from the host 2. The QoS domain is equivalent to a unit of the resource management of the NAND flash memory 5. The controller 4 allocates the write destination storage region to be used for the Qos domain ID included in the block allocate request. Thus, the host 2 can request the third type SSD to allocate a plurality of write destination storage regions corresponding to a plurality of QOS domains, respectively, by transmitting a plurality of block allocate requests which specify different Qos domain IDs to the third type SSD.

A write request received from the host 2 may include a QoS domain ID, a logical address, and the size of the write data. The QoS domain ID included in the write request is used as the identifier of the write destination storage region to which the write data should be written. The controller 4 sequentially writes the write data to the write destination storage region to which the Qos domain ID included in the write request is allocated. The controller 4 notifies the host 2 of a physical address (a block address and an offset address) indicative of the physical storage location in which the write data are written. In the third type SSD, the L2P table 31 is not managed by the controller 4, but is managed by the host 2.

A read command is a command for reading data from the NAND flash memory 5. The read command may also be referred as a read request.

A read command issued to each of the first type SSD and the second type SSD may include a logical address (starting LBA) of data to be read, the size of the data, and a data pointer (buffer address) indicative of a location in a read buffer of the host 2 to which the data should be transferred.

A read command issued to the third type SSD may include a physical address indicative of a physical storage location in which data to be read is stored, the size of the data, and a data pointer (buffer address) indicative of a location in the read buffer of the host 2 to which the data should be transferred.

An allocate command is a command for allocating one of the plurality of first storage regions (for example, one QLC block of the plurality of QLC blocks) as a write destination storage region. The allocate command may also be referred as an allocate request. The write destination storage region means a storage region in which writing of data is possible. An open zone command used in Zoned Namespaces is an example of the allocate command.

An inactivate command is a command for causing a state of the write destination storage region to transition from a first state (opened state) allocated as the write destination storage region where writing of data is possible to a second state (closed state) in which writing of data is suspended. The inactivate command may also be referred as an inactivate request. A close zone command used in Zoned Namespaces is an example of the inactivate command.

A deallocate command is a command for changing a state of a first storage region (for example, a QLC block) to a state in which data can be written again (for example, a free QLC block). The deallocate command may also be referred as a deallocate request. A reset zone command used in Zoned Namespaces is an example of the deallocate command.

The CPU 12 is a processor configured to control the host interface 11, the NAND interface 13, the DRAM interface 14, the DRAM interface 14, the DMAC 15, the SRAM 16 and the ECC encode/decode unit 17. The CPU 12 performs various processes by executing a control program (firmware) that is loaded into the DRAM 6 from the NAND flash memory 5 or a ROM (not shown) when the SSD 3 is powered on. The firmware may be loaded onto the SRAM 16. For example, the CPU 12 can perform a command process for processing various commands from the host 2. The operation of the CPU 12 is controlled by the firmware. A part or all parts of the command processes may be executed by dedicated hardware in the controller 4.

The CPU 12 can function as a flash management unit 21 and a dispatcher 22. A part or all parts of each of the flash management unit 21 and the dispatcher 22 may also be implemented by dedicated hardware in the controller 4.

Hereinafter, it is assumed that the plurality of QLC blocks included in the QLC region 202 explained in FIG. 3 are used as the plurality of first storage regions. The flash management unit 21 manages mapping between the first storage regions and the QLC blocks included in the QLC region 202 and allocates one of the QLC blocks of the QLC region 202 to each first storage region. Each QLC block may be a single physical block or may be a single super block including a plurality of physical blocks.

The flash management unit 21 receives one or more write requests from the host 2. Each of the write requests specifies a first storage region to which data should be written (for example, a first write destination storage region or a second write destination storage region).

In response to receiving one or more write requests for writing data to the first write destination storage region from the host 2, the flash management unit 21 transfers write data associated with a set of the received write requests, from a write buffer of the host 2 to an internal buffer 161 of the controller 4. A part of the memory region of the SRAM 16 may be used as the internal buffer 161. Alternatively, a part of the memory region of the DRAM 6 may be used as the internal buffer 161.

The flash management unit 21 writes the write data transferred to the internal buffer 161 to the first write destination storage region in the first write mode for writing m-bit data per memory cell. For example, the flash management unit 21 writes the write data transferred to the internal buffer 161 to a QLC block allocated to the first write destination storage region by the foggy-fine write operation for writing data of 4 bits per memory cell.

In response to receiving one or more write requests for writing data to the second write destination storage region from the host 2, the flash management unit 21 transfers write data associated with a set of the received write requests, from the write buffer of the host 2 to the internal buffer 161 of the controller 4.

The flash management unit 21 writes the write data transferred to the internal buffer 161 to the second write destination storage region in the first write mode for writing m-bit data per memory cell. For example, the flash management unit 21 writes the write data transferred to the internal buffer 161 to a QLC block allocated to the second write destination storage region by the foggy-fine write operation for writing data of 4 bits per memory cell.

Further, the flash management unit 21 performs the following process each time the flash management unit 21 receives an inactivate command (for example, a zone-close command) from the host 2.

The flash management unit 21 obtains, from the write buffer of the host 2, remaining write data among write data associated with the one or more received write requests for the first storage region, which is specified by the inactivate command. The remaining write data are data which have not been transferred to the internal buffer 161. The flash management unit 21 writes the obtained remaining data, not to the first storage region specified by the inactivate command, but to the shared flash buffer 201 shared by the plurality of first storage regions. The flash management unit 21 causes the state of the first storage region specified by the inactivate command to transition from the first state (opened state) allocated as a write destination storage region to the second state (closed state) in which writing of data is suspended.

If a process for writing the remaining write data to the first storage region specified by the inactivate command is to be performed each time an inactivate command is received, the write buffer of the host 2 may be occupied by a large amount of write data to be written to the write destination storage regions, which are to be caused to transition to the closed state.

More specifically, writing to each write destination storage region is performed using the first write mode for writing m-bit data per memory cell. Thus, if a process for writing the remaining write data to the write destination storage region which should be caused to transition to the closed state is performed, writing of data of a plurality of pages to be written last to the write destination storage region cannot be completed. For example, if a process for writing the remaining write data to the write destination storage region (here, QLC block) is performed using the foggy-fine write operation for writing data of 4 bits per memory cell, the writing of data of four pages written last to the QLC block cannot be completed. Since an inactivate command is a request for causing the first storage region (here, a QLC block) to transition to the closed state, the host 2, which has issued the inactivate command, will not issue another write request for the QLC block for a while. As a result, the fine write operation for the data of four pages written last to the QLC block cannot be started. Thus, since writing of the data of four pages cannot be completed, the data of four pages cannot be read from the QLC block for a long time. As a result, the region in the write buffer of the host 2 in which the data of four pages is stored cannot be released for a long time.

When the page size is 16 KB, the writing of data having a size of 64 KB (=4×16 KB) cannot be completed. When each NAND flash memory die has a two-plane structure, data having a size of 128 KB (=2×4×16 KB) cannot be completed.

Thus, if a process for writing the remaining data to the first storage region (QLC block) specified by the inactivate command is to be performed each time an inactivate command is received, a large amount of data for which writing cannot be completed needs to be maintained in the write buffer of the host 2. For example, in a case where 1024 first storage regions (QLC blocks) in total are caused to transition to the closed state, the write buffer of the host 2 is occupied by data having a size of 128 MB (=1024×128 KB).

In the present embodiment, the flash management unit 21 writes the remaining data, not to the individual first storage regions (QLC blocks) to be closed, but to the shared flash buffer 201 shared by the first storage regions. Thus, in a case where any one of the first storage regions in the opened state is to be closed, the remaining write data corresponding to the individual first storage regions to be closed are written to the shared flash buffer 201. Thus, in comparison with the structure in which writing of the remaining write data to the first storage region specified by the inactivate command is performed each time an inactivate command is received, the amount of write data for which writing cannot be completed can be reduced, and the number of regions which can be released in the write buffer of the host 2 can be increased.

For example, this specification assumes a case where n is equal to m, and further, the first write mode and the second write mode are write modes in which data written in one page of the pages included in a block become readable from the one page after data are written to one or more pages subsequent to the one page. This case is equivalent to a case where the shared flash buffer 201 is realized with the QLC buffer 301 (i.e., n=m), and further, writing of data to each block (QLC block) of the QLC buffer 301 is performed using, for example, the foggy-fine write operation, in a manner similar to that of writing of data to each first storage region (QLC block).

In this case, data having a size of 128 KB which are written last to the QLC buffer 301 become readable after subsequent data having a size of 128 KB are written to the QLC buffer 301.

However, in a manner different from that of the QLC blocks to be closed, writing of data to the QLC buffer 301 is not suspended. In other words, each time an inactivate command is received, writing of data to the QLC buffer 301 is performed without suspension. Thus, even in a case where 1024 QLC blocks in total are caused to transition to the closed state, of the write data to be written to these 1024 QLC blocks, the size of data which cannot be read from the QLC buffer 301 can be maintained to only 128 KB. In this way, in comparison with a case where the remaining write data are written to the individual first storage regions (QLC blocks) to be closed, the amount of write data which needs to be maintained in the write buffer of the host 2 can be largely reduced.

Further, in a case where the shared flash buffer 201 is realized with the QLC buffer 301, the individual blocks included in the shared flash buffer memory 201 are used as QLC blocks having high storage density. Thus, the total number of blocks which need to be allocated to the shared flash buffer 201 can be reduced. In this way, the total number of blocks which can be used for the storage regions of user data can be increased.

Now, this specification assumes a case where n is less than or equal to m, and the first write mode is a write mode in which data written in one page of the pages of a block allocated to the first storage region become readable from the one page after data are written to one or more pages subsequent to the one page, and further, the second write mode is a write mode in which data written in one page of the pages of a block allocated to the second storage region become readable from the one page only by writing this data to this one page.

This case is equivalent to, for example, a case where the shared flash buffer 201 is realized with the SLC buffer 401 (i.e., n≤m), and writing of data to each first storage region (QLC block) is performed using, for example, the foggy-fine write operation, and further, writing of data to each block (SLC block) of the SLC buffer 401 is performed using the SLC mode. Alternatively, this case is equivalent to a case where writing of data to each first storage region (QLC block) is performed using, for example, the foggy-fine write operation, and further, writing of data to each block (MLC block) of the shared flash buffer 201 is performed using the MLC LM mode.

In a case where the shared flash buffer 201 is realized with the SLC buffer 401, writing of data to each block (SLC block) of the SLC buffer 401 is performed using the SLC mode. Thus, all the data written in the SLC buffer 401 can be read immediately after this data are written. Since all the data which should be written to the individual first storage regions (QLC blocks) to be closed can be non-volatily stored in the SLC buffer 401, it is possible to, every time a QLC block is closed, release the entire region in the write buffer of the host 2 which has been allocated for this QLC block.

In the present embodiment, in a period before an inactivate command is received, write data are not written to the SLC buffer 401 (or the QLC buffer 301), and are written to only the write destination QLC block.

Thus, in comparison with a case where a process for writing all the write data to both the SLC buffer 401 and the write destination QLC block is performed, and a case where a process for firstly writing all the write data to only the SLC buffer 401 and writing the write data back to the write destination QLC block from the SLC buffer 401 at, for example, an idle time of the SSD 3, is performed, the total amount of data written to the SLC buffer 401 can be reduced.

As a result, the number of blocks (SLC blocks) to be allocated as the SLC buffer 401 can be decreased. Thus, the number of blocks (QLC blocks) which can be allocated as the QLC region 202 can be increased.

The dispatcher 22 obtains commands from the submission queue of the host 2. The controller 4 manages a plurality of command queues corresponding to a plurality of open QLC blocks (a plurality of write destination QLC blocks), respectively. The dispatcher 22 classifies the obtained commands into a set of write commands (write requests) and a set of commands other than the write commands.

Further, the dispatcher 22 classifies the write requests into a plurality of groups respectively corresponding to a plurality of write destination QLC blocks. The dispatcher 22 stores the write requests belonging to each group in a command queue corresponding to the group.

For example, the dispatcher 22 stores each of the write requests for writing data to write destination QLC block #1 in a command queue corresponding to write destination QLC block #1, and stores each of write requests for writing data to write destination QLC block #2 in a command queue corresponding to write destination QLC block #2.

When the total size of write data associated with a set of write requests for writing data to write destination QLC block #1 has reached the minimum write size (for example, 64 KB) of each first storage region (QLC block), the flash management unit 21 transfers the write data having the minimum write size and associated with the set of write requests from the write buffer of the host 2 to the internal buffer 161. Note that when each NAND flash memory die includes two planes, the minimum write size may be set to 128 KB.

When the total size of write data associated with a set of write requests for writing data to write destination QLC block #2 has reached the minimum write size of each first storage region (QLC block), the flash management unit 21 transfers the write data having the minimum write size and associated with the set of write requests, from the write buffer of the host 2 to the internal buffer 161.

Thus, since write data is transferred from the write buffer of the host 2 to the internal buffer 161 in a unit of the minimum write size, it is possible to prevent the internal buffer 161 from being occupied by a large number of write data portions each of which has a size less than the minimum write size and whose writing to the NAND flash memory 5 cannot be started. Thus, the capacity of the internal buffer 161 which needs to be allocated can be reduced.

The NAND interface 13 is a memory control circuit configured to control the NAND flash memory 5 under the control of the CPU 12.

The DRAM interface 14 is a DRAM control circuit configured to control the DRAM 6 under the control of the CPU 12. A part of the memory region of the DRAM 6 may be also used for storing the L2P table 31 and a block management table 32. The block management table 32 is used to store management information corresponding to each QLC block.

The DMAC 15 performs data transfer between the write buffer of the host 2 and the internal buffer 161 under the control of the CPU 12. When write data should be transferred from the write buffer of the host 2 to the internal buffer 161, the CPU 12 specifies for the DMAC 15 a transfer source address indicative of a location in the write buffer of the host 2, the size of the write data to be transferred, and a transfer destination address indicative of a location in the internal buffer 161.

When data are written to the NAND flash memory 5, the ECC encode/decode unit 17 encodes (ECC encoding) the data (in other words, the data to be written), thereby adding an error correction code (ECC) to the data. When data is read from the NAND flash memory 5, the ECC encode/decode unit 17 performs error correction of the data (ECC decoding), using the ECC added to the read data.

FIG. 8 is a diagram for explaining an operation for writing data to a QLC block in a mode for writing 4 bits per memory cell.

Here, an example of the foggy-fine write operation performed across four word lines will be described. The foggy-fine operation for QLC block #1 is performed as follows.

Firstly, the write data of four pages (P0 to P3) are transferred to the NAND flash memory 5 in a unit of a page, and a foggy write operation for writing the write data of four pages (P0 to P3) to memory cells connected to word line WL0 in QLC block #1 is performed.

Subsequently, the write data of next four pages (P4 to P7) are transferred to the NAND flash memory 5 in a unit of a page, and a foggy write operation for writing the write data of four pages (P4 to P7) to memory cells connected to word line WL1 in QLC block #1 is performed.

Subsequently, the write data of next four pages (P8 to P11) are transferred to the NAND flash memory 5 in a unit of a page, and a foggy write operation for writing the write data of four pages (P8 to P11) to memory cells connected to word line WL2 in QLC block #1 is performed.

Subsequently, the write data of next four pages (P12 to P15) are transferred to the NAND flash memory 5 in a unit of a page, and a foggy write operation for writing the write data of four pages (P12 to P15) to memory cells connected to word line WL3 in QLC block #1 is performed.

When the foggy write operation for the memory cells connected to word line WL3 is finished, a word line to be written returns to word line WL0, and a fine write operation for the memory cells connected to word line WL0 can be performed. The same write data as the write data of four pages (P0 to P3) used in the foggy write operation for word line WL0 are transferred again to the NAND flash memory 5 in a unit of a page, and a fine write operation for writing the write data of four pages (P0 to P3) to the memory cells connected to word line WL0 in QLC block #1 is performed. In this manner, the foggy-fine write operation for pages P0 to P3 is finished. As a result, data corresponding to pages P0 to P3 can be correctly read from QLC block #1.

Subsequently, the write data of next four pages (P16 to P19) are transferred to the NAND flash memory 5 in a unit of a page, and a foggy write operation for writing the write data of four pages (P16 to P19) to memory cells connected to word line WL4 in QLC block #1 is performed.

When the foggy write operation for the memory cells connected to word line WL4 is finished, a word line to be written returns to word line WL1, and a fine write operation for the memory cells connected to word line WL1 can be performed. The same write data as the write data of four pages (P4 to P7) used in the foggy write operation for word line WL1 are transferred again to the NAND flash memory 5 in a unit of a page, and a fine write operation for writing the write data of four pages (P4 to P7) to the memory cells connected to word line WL1 in QLC block #1 is performed. In this manner, the foggy-fine write operation for pages P4 to P7 is finished. As a result, data corresponding to pages P4 to P7 can be correctly read from QLC block #1.

Subsequently, the write data of next four pages (P20 to P23) are transferred to the NAND flash memory 5 in a unit of a page, and a foggy write operation for writing the write data of four pages (P20 to P23) to memory cells connected to word line WL5 in QLC block #1 is performed.

When the foggy write operation for the memory cells connected to word line WL5 is finished, a word line to be written returns to word line WL2, and a fine write operation for the memory cells connected to word line WL2 can be performed. The same write data as the write data of four pages (P8 to P11) used in the foggy write operation for word line WL2 are transferred again to the NAND flash memory 5 in a unit of a page, and a fine write operation for writing the write data of four pages (P8 to P11) to the memory cells connected to word line WL2 in QLC block #1 is performed. In this manner, the foggy-fine write operation for pages P8 to P11 is finished. As a result, data corresponding to pages P8 to P11 can be correctly read from QLC block #1.

FIG. 9 is a diagram for explaining an operation for controlling QLC blocks and the shared flash buffer 201, which is performed in the SSD 3.

In the SSD 3, until the controller 4 receives, from the host 2, an inactivate command (inactivate request) for causing write destination QLC block #1 (or write destination QLC block #2) to transition to the closed state in which writing of data is suspended, the controller 4 writes all write data received from the write buffer 51 of the host 2 only to write destination QLC block #1 (or write destination QLC block #2) via the internal buffer 161 in a write mode for writing data of m (>1, here, data of 4 bits) bits per memory cell (for example, a foggy-fine write operation), and does not write the write data to the shared flash buffer 201.

In a case where writing of data to each of write destination QLC block #1 and write destination QLC block #2 is performed by the foggy-fine write operation, when both a foggy write operation and a fine write operation for writing the write data to memory cells connected to a word line are finished, the controller 4 transmits to the host 2 a response indicative of a completion of each of one or more write requests corresponding to the write data. In other words, when the data written in write destination QLC block #1 (or write destination QLC block #2) can be read from write destination QLC block #1 (or write destination QLC block

2), the controller 4 transmits to the host 2 a response indicative of the completion of each of one or more write requests corresponding to the data.

When the controller 4 receives, from the host 2, an inactivate command (inactivate request) for causing write destination block #1 (or write destination QLC block #2) to transition to the closed state in which writing of data is suspended, the controller 4 transfers write data which have not been transferred to the internal buffer 161, from the write buffer 51 of the host 2 to the internal buffer 161.

For example, when the controller 4 receives an inactivate command (inactivate request) for write destination QLC block #1 from the host 2, the controller 4 transfers the write data which have not been transferred to the internal buffer 161, among write data associated with one or more received write requests for write destination QLC block #1, from the write buffer 51 of the host 2 to the internal buffer 161. For example, when the received write requests for writing data to write destination QLC block #1 are write request W1 to write request W5, and the write requests for which write data have not been transferred to the internal buffer 161 are write request W4 and write request W5, write data associated with write request W4 and write data associated with write request W5 are transferred from the write buffer 51 of the host 2 to the internal buffer 161 as the remaining write data.

The controller 4 does not write the remaining write data, which have been transferred to the internal buffer 161, to write destination QLC block #1, and writes the remaining write data only to the shared flash buffer 201 in a write mode for writing data of n bits (m≥n≥1) per memory cell. After the controller 4 writes the remaining write data to the shared flash buffer 201, the controller 4 causes the state of write destination QLC block #1 to transition from the opened state to the closed state. Further, the controller 4 transmits to the host 2 a response indicative of a completion of each of the write requests corresponding to the remaining write data and a response indicative of a completion of the inactivate request.

In response to receiving the response indicative of the completion of each write request, the host 2 can release the region in the write buffer 51 in which write data corresponding to each of the write requests are stored. For example, this region is available again as a region for a write destination QLC block to be newly opened.

When the controller 4 receives a write request for writing data again to QLC block #1 that is in the closed state from the host 2, the controller 4 reopens QLC block #1 as a write destination QLC block. The controller 4 reads the above remaining write data s from the shared flash buffer 201, and transfers the read remaining write data to the internal buffer 161. The remaining write data transferred from the shared flash buffer 201 to the internal buffer 161 are written to write destination QLC block #1 at a time point when this write data can be written thereto.

FIG. 10 is a diagram for explaining an operation for controlling the QLC buffer 301 used as the shared flash buffer 201.

In the SSD 3, until the controller 4 receives, from the host 2, an inactivate command (inactivate request) for causing write destination QLC block #1 (or write destination QLC block #2) to transition to the closed state in which writing of data is suspended, the controller 4 writes all write data received from the write buffer 51 of the host 2 only to write destination QLC block #1 (or write destination QLC block #2) via the internal buffer 161 in a write mode for writing data of m (>1, here, data of 4 bits) bits per memory cell (for example, a foggy-fine write operation), and does not write the write data to the QLC buffer 301.

In a case where data for each of write destination QLC block #1 and write destination QLC block #2 are written by a foggy-fine write operation, when both a foggy write operation and a fine write operation for writing write data to memory cells connected to a word line are finished, the controller 4 transmits a response indicative of a completion of each write request corresponding to this write data to the host 2. In other words, when the data written in write destination QLC block #1 (or write destination QLC block #2) become readable from write destination QLC block #1 (or write destination QLC block #2), the controller 4 transmits a response indicative of the completion of a write request corresponding to the data to the host 2.

When the controller 4 receives, from the host 2, an inactivate command (inactivate request) for causing write destination QLC block #1 (or write destination QLC block #2) to transition to the closed state in which writing of data is suspended, the controller 4 transfers write data which has not been transferred to the internal buffer 161, from the write buffer 51 of the host 2 to the internal buffer 161.

For example, when the controller 4 receives an inactivate command (inactivate request) for write destination QLC block #1 from the host 2, the controller 4 transfers remaining write data, which has not been transferred to the internal buffer 161 among write data associated with one or more received write requests for writing data to write destination QLC block #1, from the write buffer 51 of the host 2 to the internal buffer 161. The controller 4 does not write the remaining write data, which have been transferred to the internal buffer 161, to write destination QLC block #1, and writes the remaining write data only to the QLC buffer 301 in a write mode for writing data of n (=m) bits per memory cell (for example, a foggy-fine write operation). After the remaining write data are written to the QLC buffer 301, the controller 4 causes the state of write destination QLC block #1 to transition from the opened state to the closed state. Further, when the data written in the QLC buffer 301 become readable from the QLC buffer 301, the controller 4 transmits a response indicative of a completion of a write request corresponding to the data to the host 2.

In response to receiving the response indicative of the completion of the write request, the host 2 can release the region in the write buffer 51 in which write data corresponding to the write request are stored. For example, this released region is available again as a region for a newly-opened write destination QLC block.

When the controller 4 receives, from the host 2, a write request for writing data again to QLC block #1 that is in the closed state, the controller 4 reopens QLC block #1 as a write destination QLC block. The controller 4 reads the above remaining write data from the QLC buffer 301, and transfers the read remaining write data to the internal buffer 161. The remaining write data transferred from the QLC buffer 301 to the internal buffer 161 are written to write destination QLC block #1 at a time point when this remaining write data can be written thereto.

FIG. 11 is a diagram for explaining an operation for controlling the SLC buffer 401 used as the shared flash buffer 201.

In the SSD 3, until the controller 4 receives, from the host 2, an inactivate command (inactivate request) for causing write destination QLC block #1 (or write destination QLC block #2) to transition to the closed state in which writing of data is suspended, the controller 4 writes all write data received from the write buffer 51 of the host 2 only to write destination QLC block #1 (or write destination QLC block #2) via the internal buffer 161 in a write mode for writing data of m (>1, here, data of 4 bits) bits per memory cell (for example, a foggy-fine write operation), and does not write the write data to the SLC buffer 401.

In a case where data for each of write destination QLC block #1 and write destination QLC block #2 are written by the foggy-fine write operation, when both a foggy write operation and a fine write operation for writing write data to memory cells connected to a word line are finished, the controller 4 transmits a response indicative of a completion of each write request corresponding to this write data to the host 2. In other words, when the data written in write destination QLC block #1 (or write destination QLC block #2) become readable from write destination QLC block #1 (or write destination QLC block #2), the controller 4 transmits a response indicative of the completion of a write request corresponding to the data to the host 2.

When the controller 4 receives, from the host 2, an inactivate command (inactivate request) for causing write destination block #1 (or write destination QLC block #2) to transition to the closed state in which writing of data is suspended, the controller 4 transfers write data, which has not been transferred to the internal buffer 161, from the write buffer 51 of the host 2 to the internal buffer 161.

For example, when the controller 4 receives an inactivate command (inactivate request) for write destination QLC block #1 from the host 2, the controller 4 transfers remaining write data, which has not been transferred to the internal buffer 161 among write data associated with one or more received write requests for write destination QLC block #1, from the write buffer 51 of the host 2 to the internal buffer 161. The controller 4 does not write the remaining write data transferred to the internal buffer 161 to write destination QLC block #1, and writes the remaining write data only to the SLC buffer 401 in a write mode for writing n-bit data (here, data of 1 bit) per memory cell (SLC mode).

The SLC mode is an example of a write mode in which data written in one page of the pages of a block become readable by writing this data only to this one page.

After the remaining write data are written to the SLC buffer 401, the controller 4 causes the state of write destination QLC block #1 to transition from the opened state to the closed state, and further, transmits a response indicative of a completion of a write request corresponding to the write data to the host 2.

In response to receiving the response indicative of the completion of the write request, the host 2 can release the region in the write buffer 51 in which write data corresponding to the write request are stored. For example, this released region is available again as a region for a newly-opened write destination QLC block.

When the controller 4 receives, from the host 2, a write request for writing data again to QLC block #1 that is in the closed state, the controller 4 reopens QLC block #1 as a write destination QLC block. The controller 4 reads the above remaining write data from the SLC buffer 401, and transfers the read remaining write data to the internal buffer 161. The remaining write data transferred from the SLC buffer 401 to the internal buffer 161 are written to write destination QLC block #1 at a time point when this remaining write data can be written thereto.

In place of the SLC buffer 401, an MLC buffer may be used. In this case, the controller 4 writes the remaining write data only to the MLC buffer in a write mode for writing data of n bits (here, data of 2 bits) per memory cell (for example, MLC LM mode). The MLC LM mode is also an example of a write mode in which data written in one page of the pages of a block become readable by writing this data only to this one page.

FIG. 12 is a diagram for explaining a hybrid SLC buffer using both a static SLC buffer and a dynamic SLC buffer.

The static SLC buffer is a nonvolatile buffer using each of a fixed number of blocks allocated from a plurality of blocks included in the NAND flash memory 5 as an SLC block.

In a case where the SLC buffer 401 is structured by only the static SLC buffer, the number of blocks usable as the SLC buffer 401 is fixed. The maximum number of program/ erase cycles of each block in which writing within the block is performed using the SLC mode (SLC block) is approximately ten times the maximum number of program/erase cycles of each block in which writing within the block is performed using a write mode for writing 4 bits per memory cell (QLC blocks). However, the capacity of each SLC block is a quarter of the capacity of each QLC block.

For this reason, in general, in a structure using only the static SLC buffer, it is necessary to statically allocate a relatively large number of blocks for the static SLC buffer. Thus, as shown in (A) of FIG. 12, in a structure using only the static SLC buffer, the capacity of the QLC region 202 (user capacity) tends to be minimized.

The dynamic SLC buffer is a nonvolatile buffer realized by dynamically allocating blocks for the SLC buffer 401 from blocks of the QLC region 202. As shown in (B) of FIG. 12, in a structure using the dynamic SLC buffer, the capacity (user capacity) of the QLC region 202 can be increased.

However, the blocks dynamically allocated for the SLC buffer 401 are not dedicated SLC blocks, but are blocks in which writing within the blocks have been performed in a write mode for writing 4 bits per memory cell, in other words, blocks which have been used as QLC blocks. Thus, the maximum number of program/erase cycles of each block dynamically allocated for the SLC buffer 401 should be defined, not by the maximum number of program/erase cycles of an SLC block, but by the maximum number of program/erase cycles of a QLC block. Thus, the lifetime of blocks used as the dynamic SLC buffer tends to be shorter than that of dedicated SLC blocks used as the static SLC buffer.

FIG. 12 (C) illustrates the hybrid SLC buffer of the present embodiment.

The controller 4 allocates a plurality of first blocks among a plurality of blocks included in the NAND flash memory 5 for the QLC region 202 (in other words, for a plurality of QLC blocks in the QLC region 202), and further, allocates a plurality of second blocks among the plurality of blocks included in the NAND flash memory 5 for the SLC buffer 401. The second blocks are used as a static SLC buffer 401A. The number of second blocks is less than the number of first blocks.

The controller 4 firstly uses only the static SLC buffer 401A as the SLC buffer 401. Each block of the static SLC buffer 401A is used as a dedicated SLC block. In other words, the controller 4 writes data to each block in the static SLC buffer 401A in the SLC mode. The maximum number of program/erase cycles of each block in the static SLC buffer 401A is equal to the allowable maximum number of program/erase cycles of an SLC block.

The controller 4 writes the above remaining write data to the static SLC buffer 401A in the SLC mode each time the controller 4 receives the inactivate request from the host 2.

As time passes, the total amount of data written in the static SLC buffer 401A is increased. As the total amount of data written in the static SLC buffer 401A is increased, the number of program/erase cycles of each block of the static SLC buffer 401A is increased. In this way, the degree of wear of each block of the static SLC buffer 401A is increased.

Based on the degree of wear (for example, the number of program/erase cycles, the rate of bit errors and a program/ erase error) of each block of the static SLC buffer 401A, the controller 4 detects a defective block in the static SLC buffer 401. For example, in a case where a defective block is detected based on the number of program/erase cycles of each block of the static SLC buffer 401A, the controller 4 compares the number of program/erase cycles of each block of the static SLC buffer 401A with the allowable maximum number of program/erase cycles of the SLC block. A block in which the number of program/erase cycles has reached the allowable maximum number of program/erase cycles of the SLC block is regarded as a defective block by the controller 4. A defective block is a block which cannot be normally used any more.

As the number of defective blocks in the static SLC buffer 401A is increased, the number of available blocks in the static SLC buffer 401A is decreased.

When the number of available blocks in the static SLC buffer 401A is less than threshold Th1, the controller 4 determines that the static SLC buffer 401A has been worn out.

In this case, the controller 4 allocates one block among the blocks allocated for the QLC region 202 (e.g., free QLC block) as the write destination block for the SLC buffer 401. Each time the controller 4 receives the inactivate request from the host 2, the controller 4 writes the remaining write data to a block which is allocated from the QLC region 202 as the write destination block for the SLC buffer 401. When this block is entirely filled with data, the controller 4 allocates another block (among the blocks allocated for the QLC region 202 free QLC block) as the write destination block for the SLC buffer 401.

Each block allocated from the blocks for the QLC region 202 as the write destination block for the SLC buffer 401 is used as the dynamic SLC buffer 401B.

In this way, until the static SLC buffer 401A has been worn out, the controller 4 performs writing of the above remaining write data, using the static SLC buffer 401A.

When the static SLC buffer 401A has been worn out, the controller 4 allocates one block among the blocks for the QLC region 202 to the SLC buffer 401 as the dynamic SLC buffer 401B, and performs writing of the above remaining write data, using the dynamic SLC buffer 401B.

Since the maximum number of program/erase cycles of each block included in the static SLC buffer 401A can be defined by the allowable maximum number of program/ erase cycles of the SLC block, the lifetime of the SSD 3 can be extended compared to the structure using only the dynamic SLC buffer shown in (B) of FIG. 12. Also by using the hybrid SLC buffer, the user capacity can be increased compared to the structure using only the static SLC buffer shown in (A) of FIG. 12.

FIG. 13 is a diagram for explaining an operation for controlling the hybrid SLC buffer.

A fixed number of blocks are allocated in advance to the static SLC buffer 401A. When the number of blocks corresponding to user capacity is N and the number of blocks allocated to the QLC region 202 is M, M is greater than N to some extent. The maximum number of blocks which can be allocated from the QLC region 202 as the dynamic SLC buffer 401B is less than (M-N).

As described above, after a QLC block in the closed state is reopened, the data stored in the dynamic SLC buffer 401B are written to the reopened QLC block. Thus, each block in the dynamic SLC buffer 401B which becomes to include only invalid data after data has been written to the reopened QLC block is released as a free block. This free block is returned to the QLC region 202. The returned block may be used as a QLC block again, or may be allocated to the dynamic SLC buffer 401B again.

FIG. 14 is a block diagram illustrating a write operation performed in the SSD 3.

The controller 4 of the SSD 3 manages a plurality of command queues corresponding to a plurality of open write destination QLC blocks, respectively. Command queue #1 is used to store one or more write requests for writing data to write destination QLC block #1. Command queue #2 is used to store one or more write requests for writing data to write destination QLC block #2. Command queue #3 is used to store one or more write requests for writing data to write destination QLC block #3. Command queue #p is used to store one or more write requests for writing data to write destination QLC block #p.

Each command (request) stored in the submission queue (SQ) of the host 2 is fetched by the dispatcher 22. Each write request for writing data to write destination QLC block #1 is stored in command queue #1 by the dispatcher 22. Each write request for writing data to write destination QLC block #2 is stored in command queue #2 by the dispatcher 22. Each write request for writing data to write destination QLC block #3 is stored in command queue #3 by the dispatcher 22. Each write request for writing data to write destination QLC block #p is stored in command queue #p by the dispatcher 22.

With respect to each command queue, the total size of write data associated with a set of stored write requests is examined by the flash management unit 21. When the total size of write data associated with the set of write requests stored in the command queue has reached a threshold, for example, the minimum write size of each QLC block, write data having the minimum write size are transferred from the write buffer 51 of the host 2 to the internal buffer 161 by the DMAC 15 under the control of the flash management unit 21.

By this configuration, it is possible to prevent the internal buffer 161 from being occupied by a plurality pieces of write data each having a size less than the minimum write size, i.e., write data whose writing to a write destination QLC block cannot be started. Thus, required capacity of the internal buffer 161 can be reduced.

The transfer of write data from the write buffer 51 of the host 2 to the internal buffer 161 is performed, not in the order in which write requests are fetched, but in the same order as the order of writing write data to each write destination QLC block. For example, in a case where write data of four pages corresponding to page #0 to page #3 of write destination QLC block #1 are transferred from the write buffer 51 of the host 2 to the internal buffer 161, the flash management unit 21 transfers four 16-KB write data items for the respective pages #0 to #3 from the write buffer 51 of the host 2 to the internal buffer 161 in a unit of a page in the order of the 16-KB write data for page #0, the 16-KB write data for page #1, the 16-KB write data for page #2 and the 16-KB write data for page #3.

Regarding a specific QLC block in which the write speed by the host 2 is slow, the flash management unit 21 may use the capacity of such a QLC block as the above threshold. In this case, the flash management unit 21 determines whether the total size of write data associated with a set of write requests for the specific QLC block has reached the capacity of a QLC block. When the total size of write data associated with a set of write requests for the specific QLC block has reached the capacity of the QLC block, the flash management unit 21 transfers write data having a size corresponding to the capacity of the QLC block from the write buffer 51 of the host 2 to the internal buffer 161 in, for example, a unit of a page, using the DMAC 15. The flash management unit 21 performs an erase operation for the specific QLC block, and writes the write data, have a size corresponding to the capacity of the QLC block, to the specific QLC block.

FIG. 15 is a block diagram illustrating a sequence of a write operation and a sequence of a read operation, which are performed in the SSD 3.

FIG. 15 illustrates a case where the SSD 3 is realized as the above first type SSD which supports Zoned Namespaces of NVMe specification. As the shared flash buffer 201, the SLC buffer 401 is used.

When the SSD 3 is realized as the first type SSD, the SSD 3 operates as a zoned device. The zoned device is a device which is accessed using a plurality of logical address ranges (a plurality of LBA ranges) obtained by dividing the logical address space used by the host 2 to access the SSD 3.

The controller 4 of the SSD 3 manages a plurality of zones to which a plurality of LBA ranges are assigned, respectively. Each of the zones is a unit for accessing the NAND flash memory 5 of the SSD 3. The controller 4 is configured to manage mapping between a plurality of QLC blocks (i.e., a plurality of physical blocks or a plurality of QLC super blocks) included in the QLC region 202 and a plurality of zones, and can allocate any one QLC block as one zone.

A QLC block corresponding to a zone is accessed using consecutive logical addresses included in an LBA range assigned to this zone. Writing within one zone is basically sequentially performed.

A write command (write request) issued from the host 2 to the SSD 3 may include a logical address (start LBA) indicative of a first sector to which write data should be written, data size of the write data, and a data pointer (buffer address) indicative of a location in the memory (write buffer) of the host 2 in which the write data is stored. Hereinafter, the memory of the host 2 may be simply called a host memory.

An upper-bits portion of the start LBA included in the write request is used as an identifier which specifies the zone to which write data associated with the write request are to be written. A lower-bits portion of the start LBA included in the write request specifies an offset in the zone to which the write data are to be written. Thus, the start LBA specified in a write request is indicative of one zone of a plurality of zones and the offset in the one zone to which the write data are to be written.

The data size of write data may be specified by, for example, the number of sectors (e.g., the number of logical blocks). A sector corresponds to a minimum data size which can be specified by the host 2. In other words, the data size is indicated by multiples of sectors. A sector is also called a logical block.

A read command (read request) issued from the host 2 to the SSD 3 may include a logical address (start LBA) indicative of a first sector from which read target data are to be read, the data size of the read target data, and a data pointer indicative of a location in the host memory (read buffer) to which the read target data are to be transferred.

An upper-bits portion of the start LBA included in the read request is used as an identifier which specifies a zone in which the read target data are stored. A lower-bits portion of the start LBA included in the read request specifies an offset in the zone in which the read target data are stored. Thus, the start LBA specified in the read command is indicative of a zone, and the offset in the zone in which the read target data are stored.

A zone management command issued from the host 2 to the SSD 3 may include an open zone command (open request), a close zone command (close request), and a reset zone command (reset request).

An open zone command (open request) is used as the above allocate command. An open request is a command (request) for causing one of a plurality of zones each in an empty state to transition to an opened state in which the zone can be used for writing of data. An open request includes a logical address which specifies a zone to be caused to transition to the opened state. The upper-bits portion of the logical address specified in the open request is used as an identifier which specifies a zone to be caused to transition to the opened state.

A close zone command (close request) is used as the above inactivate command. A close request is a command (request) for causing the state of a zone to transition from the opened state to a closed state in which writing of data is suspended. A close request includes a logical address which specifies a zone to be caused to transition to the closed state. The upper-bits portion of the logical address specified in the close request is used as an identifier which specifies a zone to be caused to the closed state.

A reset zone command (reset request) is used as the above deallocate command. A reset request is a request for resetting a zone in which rewrite is to be performed, thereby causing the zone to transition to an empty state. For example, the reset request is used to cause a zone in a full state, which is filled with data, to transition to the empty state which does not include valid data. The valid data means data associated with a logical address. The reset request includes a logical address which specifies a zone to be caused to transition to the empty state. The upper-bits portion of the logical address specified by the reset request is used as an identifier which specifies a zone to be caused to transition to the empty state.

The state of each QLC block used as a zone is generally classified into an opened state (open zone), a closed state (closed zone), a full state (full zone) and an empty state (empty zone).

A QLC block in the opened state is a block allocated as a write destination block in which writing of data is possible, and is used as a zone in the opened state. The flash management unit 21 manages each QLC block in the opened state, using an open zone list 101.

A QLC block in the closed state is a QLC block in which writing of data is suspended, and is equivalent to a zone in the closed state. A QLC block in which writing of data is suspended indicates a QLC block in which data is written in only a part of this QLC block, in other words, is a QLC block partially written with data. In a QLC block in the closed state, some pages are available for writing of data. The flash management unit 21 manages each QLC block in the closed state, using a closed zone list 102.

A QLC block in the full state is a block entirely filled with data, and is equivalent to a zone in the full state. The flash management unit 21 manages each QLC zone in the full state, using a full zone list 103.

A QLC block in the empty state is a free QLC block, and is equivalent to a reset zone. The flash management unit 21 manages each QLC block in the empty state, using an empty zone list 104.

The host 2 can cause a plurality of QLC blocks (a plurality of zones) to transition to the opened state by repeating transmitting an open request to the SSD 3.

When the flash management unit 21 receives, from the host 2, each write request for writing data to QLC block #1 (zone #1) in the opened state, the flash management unit 21 transfers write data having the minimum write size of each QLC block from the write buffer 51 of the host 2 to the internal buffer 161, using the DMAC 15. The flash management unit 21 does not write the write data transferred to the internal buffer 161 to the SLC buffer 401, and writes the write data only to QLC block #1 (zone #1).

When the flash management unit 21 receives, from the host 2, each write request for writing data to QLC block #2 (zone #2) in the opened state, the flash management unit 21 transfers write data having the minimum write size of each QLC block from the write buffer 51 of the host 2 to the internal buffer 161, using the DMAC 15. The flash management unit 21 does not write the write data transferred to the internal buffer 161 to the SLC buffer 401, and writes the write data only to QLC block #2 (zone #2).

When writing data to a QLC block (zone) in the opened state is not performed for a while, the host 2 transmits a close request to the SSD 3 for causing the QLC block (zone) to transition to the closed state to release the region of the write buffer 51 of the host 2 allocated for the QLC block (zone).

When a close request which specifies a logical address indicative of QLC block #1 (zone #1) is received from the host 2, there is a possibility that the above command queue #1 corresponding to QLC block #1 (zone #1) stores a write request for which writing of data to QLC block #1 (zone #1) cannot be started yet. This is because write data associated with each write command are not transferred from the write buffer 51 of the host 2 to the internal buffer 161 until a set of write commands corresponding to write data of four pages to be written to the next write location of QLC block #1 (zone #1) is accumulated in command queue #1.

The flash management unit 21 transfers remaining write data, which has not been transferred to the internal buffer 161 among write data associated with the respective received write commands for QLC block #1 (zone #1), from the write buffer 51 of the host 2 to the internal buffer 161, using the DMAC 15. The flash management unit 21 does not write the remaining write data transferred to the internal buffer 161 to QLC block #1 (zone #1), and writes the remaining write data to the SLC buffer 401. All the write data written in the SLC buffer 401 can be read immediately after the write data are written. Thus, since all the data for QLC block #1 (zone #1) to be closed can be non-volatilely stored in the SLC buffer 401, the entire region allocated in the write buffer 51 of the host 2 for QLC block #1 (zone #1) can be released.

In a case where the internal buffer 161 stores write data that has not yet been finished to be written to QLC block #1 (zone #1) (for example, write data for which only a foggy write operation has been finished and a fine write operation has not been finished), the flash management unit 21 writes this write data to the SLC buffer 401 together with the remaining write data.

The flash management unit 21 causes the state of QLC block #1 (zone #1) to transition to the closed state. In this case, the flash management unit 21 removes QLC block #1 (zone #1) from the open zone list 101, and adds QLC block #1 (zone #1) to the closed zone list 102.

The SLC buffer 401 may be realized as the above hybrid SLC buffer using the static SLC buffer and the dynamic SLC buffer. The SLC buffer 401 may include the above SLC blocks. Until the static SLC buffer has been worn out, the flash management unit 21 writes the remaining write data for the QLC block (zone) to be closed to the static SLC buffer every time the flash management unit 21 receives a close request.

In this case, the flash management unit 21 writes the remaining write data to an open write destination SLC block (open SLC block #1) in the SLC buffer 401 (static SLC buffer) in the SLC mode. When the write destination SLC block is entirely filled with data, the flash management unit 21 manages the write destination SLC block as an SLC block in the full state.

The flash management unit 21 may manage all the SLC blocks in the full state, using a first-in-first-out (FIFO) list. The FIFO list includes a plurality of entries. When an SLC block in the full state is added to the FIFO list, each SLC block stored in a corresponding entry of the FIFO list moves to the exit side of the FIFO list by one entry. The flash management unit 21 selects the SLC block which has reached the exit of the FIFO list (e.g., the oldest SLC block) as a copy source block for the garbage collection (GC) of the SLC buffer 401. The flash management unit 21 determines whether valid data is stored in the selected SLC block.

When valid data is not stored in the selected SLC block, the flash management unit 21 performs an erase operation for the selected SLC block and allocates the selected SLC block as a new write destination SLC block.

When valid data is stored in the selected SLC block, the flash management unit 21 copies the valid data stored in the selected SLC block to a write destination SLC block (open SLC block #2) for the GC. The flash management unit 21 updates the L2P table 31 and maps a physical address indicative of the storage location in the write destination SLC block to which the valid data has been copied to the logical address of the copied valid data. When the copy of all the valid data in the selected SLC block is completed, the flash management unit 21 performs an erase operation for the selected SLC block and allocates the selected SLC block as a new write destination SLC block.

In this way, a fixed number of SLC blocks in the static SLC buffer are allocated as a write destination SLC block in order by a FIFO method. Thus, the number of program/erase cycles of these SLC blocks can be increased at the same rate.

When the number of available SLC blocks in the static SLC buffer is less than threshold Th1 (i.e., wear out), each time a new write destination SLC block needs to be allocated, in other words, each time the write destination SLC block is entirely filled with data, the flash management unit 21 selects a QLC block from the free QLC blocks managed by the empty zone list 104, and allocates the selected QLC block as a new write destination SLC block (open SLC block #1) for the SLC buffer 401. The QLC block may be allocated as a new write destination SLC block (open SLC block #2) for GC.

The QLC block is used as one element of the blocks constituting the dynamic SLC buffer.

For example, the flash management unit 21 opens the QLC block as a new write destination SLC block (open SLC block #1) for the SLC buffer 401, and writes write data for the QLC block (zone) to be closed to the opened write destination SLC block in the SLC mode.

When the opened write destination SLC block is entirely filled with data, the flash management unit 21 adds this write destination SLC block to the FIFO list. The write destination SLC block reaches the exit of the FIFO list after some subsequent QLC blocks are used as a write destination SLC block.

In this case, the flash management unit 21 selects the SLC block which has reached the exit of the FIFO list as a copy source block for GC. When valid data is not stored in the selected SLC block, the flash management unit 21 adds the selected SLC block to the empty zone list 104 for the QLC region 202, thereby returning the selected SLC block to the QLC region 202.

When valid data is stored in the selected SLC block, the flash management unit 21 copies the valid data stored in the selected SLC block to a write destination SLC block (open SLC block #2) for the GC. The flash management unit 21 updates the L2P table 31 and maps a physical address indicative of the storage location in the write destination SLC block to which the valid data has been copied to the logical address of the copied valid data. When the copy of all the valid data in the selected SLC block is completed, the flash management unit 21 adds the selected SLC block to the empty zone list 104 for the QLC region 202, thereby returning the selected SLC block to the QLC region 202.

QLC block #1 (zone #1) which transitioned to the closed state includes pages available for data write. Thus, the host 2 can transmit to the SSD 3 a write request for writing data to QLC block #1 (zone #1) in the closed state as needed.

When the flash management unit 21 receives, from the host 2, one or more write requests for writing data to QLC block #1 (zone #1) in the closed state, the flash management unit 21 reads write data for QLC block #1 (zone #1) stored in the SLC buffer 401, and stores the read write data to the internal buffer 161. In this way, the write data for QLC block #1 (zone #1) are transferred from the SLC buffer 401 to the internal buffer 161. Then, the write data transferred from the SLC buffer 401 to the internal buffer 161 are written to QLC block #1 (zone #1), for example, after one or more subsequent write commands for writing data for QLC block #1 (zone #1) are received. In this case, write data for QLC block #1 (zone #1) associated with one or more subsequent write commands are transferred from the write buffer 51 of the host 2 to the internal buffer 161. The write data transferred from the SLC buffer 401 to the internal buffer 161 are written to QLC block #1 (zone #1) together with the write data for QLC block #1 (zone #1) transferred from the write buffer 51 of the host 2 to the internal buffer 161.

Regarding each QLC block (zone) in the opened state, the closed state or the full state, the flash management unit 21 manages storage location information indicative of whether data stored in each storage location can or cannot be read from the QLC block (zone), using the block management table 32.

Each storage location is a storage location in the shared flash buffer 201 (in FIG. 15, the SLC buffer 401), or a storage location in the write buffer 51 of the host 2. For example, each storage location may be managed in a unit of a sector having a size such as 4 KB.

When the flash management unit 21 receives, from the host 2, a read command (read request) which specifies a start LBA indicative of a QLC zone and an offset in the QLC zone, and the data size of read target data, the flash management unit 21 determines whether an LBA range corresponding to the read target data is included in the readable area in the QLC block (zone). An LBA range corresponding to the read target data is defined by the offset and the data size specified in the read command.

When the LBA range corresponding to the read target data is included in the readable area in the QLC block (zone), the flash management unit 21 reads the read target data from the QLC block (zone), and transmits the read target data to the host 2 as read hit data, using the DMAC 15.

When the LBA range corresponding to the read target data is not included in the readable area in the QLC block (zone), the flash management unit 21 reads the read target data from the SLC buffer 401 or the write buffer 51 of the host 2, based on the storage location information corresponding to the QLC block (zone), and transmits the read target data to the host 2 as read hit data, using the DMAC 15.

The flash management unit 21 may perform only a process for notifying the host 2 that the read target data are not present in the SSD 3, instead of reading the read target data from the write buffer 51 of the host 2. In this case, the flash management unit 21 may notify the host 2 of the location in the write buffer 51 of the host 2 in which the read target data are present.

Regarding each QLC block (zone) in the full state filled with data, all the LBA ranges of the QLC zone are managed as the readable area.

When all the data stored in a QLC block (zone) in the full state becomes unnecessary data which are not to be used, the host 2 may transmit a reset request which specifies a logical address indicative of the QLC block (zone) to the SSD 3. In response to receiving the reset request from the host 2, the flash management unit 21 causes the state of the QLC block (zone) to transition to the empty state.

When the host 2 wishes to write data to the QLC block (zone) in the empty state, the host 2 transmits to the SSD 3 an open request which specifies a logical address indicative of the QLC block (zone) in the empty state. In response to receiving the open request from the host 2, the flash management unit 21 performs an erase operation for the QLC block (zone) and causes the state of the QLC block (zone) to transition from the empty state to the opened state.

FIG. 16 is a block diagram illustrating another example of the sequence of the write operation and the sequence of the read operation, which are performed in the SSD 3.

In FIG. 16, the QLC buffer 301 is used as the shared flash buffer 201. The QLC buffer 301 is basically controlled by the same method as the method for the dynamic SLC buffer.

FIG. 17 is a flowchart illustrating a procedure of the write operation performed in the SSD 3 and a procedure of an operation for causing an open QLC block to transition to a state in which writing of data is suspended (i.e., closed state).

In FIG. 17, a case where write data is written to two write destination regions, that is, to a first write destination region (write destination QLC block #1) and a second write destination region (write destination QLC block #2), which are allocated from a plurality of QLC blocks, is illustrated. The same process as the process for writing write data to the first write destination region (write destination QLC block #1) and the second write destination region (write destination QLC block #2) can be applied for more than two write destination regions. Each write destination region is an open first storage region (for example, an open zone).

When the controller 4 of the SSD 3 receives a write request from the host 2 (YES in step S11), the controller 4 determines whether the received write request is a write request for writing data to the first write destination region (write destination QLC block #1) or a write request for writing data to the second write destination region (write destination QLC block #2) (steps S12 and S17).

When the received write request is a write request for writing data to the first write destination region (write destination QLC block #1) (YES in step S12), the controller 4 stores the received write request in command queue #1 corresponding to write destination QLC block #1, and determines whether the condition for staring the transfer of the write data to be written to write destination QLC block #1 is satisfied (step S13).

In step S13, the controller 4 determines whether the total size of write data associated with a set of write requests stored in command queue #1 has reached the minimum write size (for example, a size of four pages) of a QLC block.

When the total size of write data associated with a set of the write requests stored in command queue #1 has reached the minimum write size of the QLC block, the controller 4 determines that the condition for starting the transfer of the write data to be written to write destination QLC block #1 is satisfied (YES in step S13).

In this case, the controller 4 transfers the write data associated with a set of write requests stored in command queue #1 from the write buffer 51 of the host 2 to the internal buffer 161, using the DMAC 15 (step S14). The transferred write data have the minimum write size necessary for the write operation of write destination QLC block #1.

The controller 4 writes the write data transferred to the internal buffer 161 to write destination QLC block #1 in a write mode for writing data of m bits (here, data of 4 bits) per memory cell, for example, in the foggy-fine write operation (step S15).

Thus, each time a set of write requests for writing write data having the minimum write size is accumulated in command queue #1, the controller 4 transfers the write data from the write buffer 51 of the host 2 to the internal buffer 161 and performs an operation for writing the write data to write destination QLC block #1. When certain write data become readable from write destination QLC block #1 by finishing of the fine write operation of the write data, the controller 4 transmits a response indicative of a completion of a write request corresponding to the write data which become readable, to the host 2 (step S16).

When the received write request is a write request for writing data to the second write destination region (write destination QLC block #2) (YES in step S17), the controller 4 stores the received write request in command queue #2 corresponding to write destination QLC block #2, and determines whether the condition for starting the transfer of the write data to be written to write destination QLC block #2 is satisfied (step S18).

In step S18, the controller 4 determines whether the total size of write data associated with a set of write requests stored in command queue #2 has reached the minimum write size (for example, a size of four pages) of a QLC block.

When the total size of write data associated with a set of write requests stored in command queue #2 has reached the minimum write size of the QLC block, the controller 4 determines that the condition for staring the transfer of the write data to be written to write destination QLC block #2 is satisfied (YES in step S18).

In this case, the controller 4 transfers the write data associated with a set of write requests stored in command queue #2 from the write buffer 51 of the host 2 to the internal buffer 161, using the DMAC 15 (step S19). The transferred write data have the minimum write size necessary for the write operation of write destination QLC block #2.

The controller 4 writes the write data transferred to the internal buffer 161 to write destination QLC block #2 in a write mode for writing data of m bits (here, data of 4 bits) per memory cell, for example, in the foggy-fine write operation (step S20).

Thus, each time a set of write requests for writing write data having the minimum write size is accumulated in command queue #2, the controller 4 transfers the write data from the write buffer 51 of the host 2 to the internal buffer 161 and performs an operation for writing the write data to write destination QLC block #2. When certain write data become readable from write destination QLC block #2 by finishing of the fine write operation of the write data, the controller 4 transmits a response indicative of a completion of a write request corresponding to the write data which become readable, to the host 2 (step S16).

When the controller 4 receives, from the host 2, an inactivate request (for example, a close request) for causing the state of a first storage region to transition from an opened state in which the first storage region is available as a write destination storage region to a closed state in which writing of data is suspended (YES in step S21), the controller 4 determines whether the first storage region specified by the inactivate request is the first write destination storage region (QLC block #1) or the second write destination storage region (QLC block #2) (steps S22 and S26).

When the first storage region specified by the inactivate request (close request) is the first write destination storage region (QLC block #1) (YES in step S22), the controller 4 obtains, from the write buffer 51 of the host 2, remaining write data which have not been transferred to the internal buffer 161 among write data associated with one or more received write requests for QLC block #1 (step S23).

The controller 4 writes the remaining write data obtained from the write buffer 51 of the host 2, to the shared flash buffer 201 in the second write mode for writing n-bit data per memory cell (step S24). In a case where writing within the first write destination storage region (QLC block #1) is performed by the foggy-fine write operation, in step S24, the controller 4 obtains first write data which have not become readable from QLC block #1, from the internal buffer 161, and writes the remaining write data obtained from the write buffer 51 of the host 2 to the shared flash buffer 201 in the second write mode together with the first write data. Thus, the first write data for which only the foggy fine operation has been finished and the fine write operation has not been performed can be also non-volatilely stored, in the shared flash buffer 201.

The controller 4 transmits, to the host 2, a response indicative of a completion of each write request corresponding to write data which become readable from the shared flash buffer 201, and a response indicative of a completion of the inactivate request (step S25). In a case where the second write mode applied to the shared flash buffer 201 is a write mode in which data written in one page of the pages of a block allocated to the shared flash buffer 201 become readable by writing the data only to this page, for example, the SLC mode or MLC LM mode, in response to writing write data to the shared flash buffer 201, the controller 4 transmits, to the host 2, a response indicative of the completion of one or more received write requests corresponding to the write data. In a case where the second write mode applied to the shared flash buffer 201 is a write mode in which data written in one page of the pages of a block allocated to the shared flash buffer 201 become readable after data are written to one or more pages subsequent to the one page, for example, the foggy-fine write operation, when the write data written in the block allocated to the shared flash buffer 201 become readable from the block, the controller 4 transmits, to the host 2, a response indicative of the completion of one or more received write requests corresponding to the write data.

When the first storage region specified by the inactivate request (close request) is the second write destination storage region (QLC block #2) (YES in step S26), the controller

4 obtains, from the write buffer 51 of the host 2, remaining write data which have not been transferred to the internal buffer 161 among write data associated with one or more received write requests for QLC block #2 (step S27). The controller 4 performs the processes of steps S24 and S25.

FIG. 18 is a flowchart illustrating a procedure of an operation for controlling the hybrid SLC buffer.

Firstly, the controller 4 allocates a set of first blocks among a plurality of blocks included in the NAND flash memory 5 for the QLC region 202, and further, allocates a set of second blocks among the plurality of blocks of the NAND flash memory 5 for the SLC buffer 401 (step S31). The number of second blocks allocated for the SLC buffer 401 is fixed. These second blocks are used as the static SLC buffer 401A. The number of second blocks allocated for the SLC buffer 401 is less than the number of first blocks allocated for the QLC region 202.

Each time the controller 4 receives an inactivate request (for example, a close request) from the host 2, the controller 4 obtains, from the write buffer 51 of the host 2, remaining write data which have not been transferred to the internal buffer 161 among write data associated with one or more received write requests for the first storage region (QLC block) specified by the inactivate request, and writes the remaining write data to the static SLC buffer 401A in the SLC mode (step S32). In step S32, the controller 4 allocates one block of the blocks allocated for the static SLC buffer 401A as the write destination SLC block for the static SLC buffer 401A. The controller 4 writes the remaining write data to the write destination SLC block in the SLC mode. When write data which have not become readable from the first storage region (QLC block) specified by the inactivate request are stored in the internal buffer 161, the controller 4 obtains, from the internal buffer 161, the write data which have not become readable, and writes the remaining write data and the write data obtained from the internal buffer 161, to the write destination SLC block in the SLC mode.

The controller 4 detects a defective block in the blocks of the static SLC buffer 401A, based on, for example, the degree of wear of each block of the static SLC buffer 401A. In a process for detecting a defective block, for example, the controller 4 may compare the number of program/erase cycles of each block of the static SLC buffer 401A with the allowable maximum number of program/erase cycles of SLC block and detect a block which has reached the allowable maximum number of program/erase cycles of SLC block as a defective block.

When the controller 4 detects a block in the static SLC buffer 401A as a defective block (YES in step S33), the controller 4 adds the detected block to a defective block list (step S34). Thus, the number of available blocks in the static SLC buffer 401A is decreased by one.

When a new write destination SLC block for the static SLC buffer 401A needs to be allocated (YES in step S35), in other words, when the current write destination SLC block for the static SLC buffer 401A is entirely filled with data, the controller 4 determines whether the number of available blocks in the static SLC buffer 401 is less than threshold Th1 (step S36).

When the number of available blocks in the static SLC buffer 401A is greater than or equal to threshold Th1 (NO in step S36), the controller 4 allocates a block in the static SLC buffer 401A as a new write destination SLC block for the static SLC buffer 401A (step S37). Each time the controller 4 receives an inactivate request (for example, a close request) from the host 2, the controller 4 performs the process of step S32.

When the number of available blocks in the static SLC buffer 401A is less than threshold Th1 (YES in step S36), the controller 4 determines that the static SLC buffer 401 has been worn out.

In this case, the controller 4 selects one block from a set of blocks allocated for the QLC region 202, and allocates the selected block as a write destination block for the dynamic SLC buffer 401B (step S38). In step S38, the controller 4 selects one block from a set of blocks (free QLC blocks) in the empty state managed by the empty zone list 104.

Each time the controller 4 receives an inactivate request (for example, a close request) from the host 2, the controller 4 obtains, from the write buffer of the host 2, remaining write data which have not been transferred to the internal buffer 161 among write data associated with one or more received write requests for the first storage region (QLC block) specified by the inactivate request, and writes the remaining write data to the write destination block for the dynamic SLC buffer 401B in the SLC mode (step S39). When write data which have not become readable from the first storage region (QLC block) specified by the inactivate request are stored in the internal buffer 161, the controller 4 obtains, from the internal buffer 161, the write data which have not become readable, and writes the remaining write data and the write data obtained from the internal buffer 161, to the write destination block for the dynamic SLC buffer 401B in the SLC mode.

When a new write destination block for the dynamic SLC buffer 401B needs to be allocated (YES in step S40), in other words, when the current write destination block for the dynamic SLC buffer 401B is entirely filled with data, the controller 4 performs the process of step S38 again. Specifically, the controller 4 selects another block from a set of blocks in the empty state (free QLC blocks) managed by the empty zone list 104, and allocates the selected block as a new write destination block for the dynamic SLC buffer 401B.

FIG. 19 is a flowchart illustrating a procedure of an operation performed in the SSD 3 in response to receiving a write request for a QLC block in the closed state.

When the controller 4 receives, from the host 2, a write request for writing data to a QLC block in the closed state (YES in step S51), the controller 4 reopens the QLC block, and causes the state of the QLC block to transition from the closed state to the opened state (step S52).

The controller 4 transfers write data for the QLC block which are stored in the shared flash buffer 201, from the shared flash buffer 201 to the internal buffer 161 (step S53), and performs a write process for writing the write data transferred to the internal buffer 161 and write data for the QLC block newly transferred from the write buffer 51 of the host 2, to the QLC block (step S54).

FIG. 20 is a diagram for explaining the capacity of an SLC buffer required for an SSD of a comparative example and the capacity of the SLC buffer required for the SSD 3.

As shown in (A) of FIG. 20, the SSD of the comparative example performs a process for writing all write data to both the SLC buffer 401 and the write destination QLC block, or a process for firstly writing all write data only to the SLC buffer 401 and writing the write data back from the SLC buffer 401 to the write destination QLC block at, for example, an idle time of the SSD of the comparative example. Thus, in the SSD of the comparative example, all the data to be written to the QLC region 202 are also written to the SLC buffer 401.

In a case where the host 2 sequentially performs writing within each QLC block of the QLC region 202, each QLC block of the QLC region 202 does not include invalid data. Thus, GC is not performed for the QLC region 202.

Regarding the SLC buffer 401, a plurality of write data to be written to different QLC blocks are written to the SLC buffer 401. Therefore, GC needs to be applied to the SLC buffer 401.

For example, it is assumed that the total amount of data written to the QLC region 202 by the host 2 (TBW: Total Bytes Written) is A [TB]. In this case, the total amount of data which needs to be written to the SLC buffer 401 is A×(WA) [TB]. Here, WA indicates the write amplification of the SLC buffer 401. Since GC needs to be applied to the SLC buffer 401, the write amplification WA of the SLC buffer 401 is greater than one.

As shown in (B) of FIG. 20, in the SSD 3 of the present embodiment, write data are written to the SLC buffer 401 only when an inactivate request is received from the host 2.

For example, it is assumed that the total amount of data written to the QLC region 202 by the host 2 is A [TB], and the total amount of data directly written to the QLC region 202 is C [TB], and the total amount of data written to the SLC buffer 401 by all inactivate requests is B [TB].

Regarding A [TB], B [TB] and C [TB], the following relationship is established.

$$A = B + C$$

$$C > 0$$

$$B < A$$

The total amount of data written to the QLC region 202 is A (=B+C) [TB].

The total amount of data which needs to be written to the SLC buffer 401 is B×(WA) [TB]. Since B is less than A, in the present embodiment, the total amount of data which needs to be written to the SLC buffer 401 can be reduced.

As explained above, in the present embodiment, when the controller 4 receives an inactivate request from the host 2, the controller 4 transfers remaining write data which have not been transferred to the internal buffer 161 among write data associated with received write requests for writing data to the first storage region specified by the inactivate request, from the write buffer of the host 2 to the internal buffer 161. The controller 4 writes the remaining write data to the second storage region (shared flash buffer 201) shared by a plurality of first storage regions.

Thus, in a case where any one of the first storage regions in the opened state is closed, remaining write data corresponding to the individual first storage regions to be closed are written to the shared flash buffer 201. Thus, in comparison with the structure of writing the remaining write data to the first storage region specified by an inactivate request each time the inactivate request is received, the amount of write data for which writing cannot be completed can be reduced, and the number of regions which can be released in the write buffer of the host 2 can be increased.

Further, in the present embodiment, in comparison with a case where a process for writing all write data to both the shared flash buffer 201 and the QLC region 202 is performed, and a case where a process for firstly writing all write data only to the shared flash buffer 201 and writing the write data back from the shared flash buffer 201 to the QLC region 202 at, for example, an idle time of the SSD 3, is performed, the total amount of data written to the shared flash buffer 201 can be reduced.

As a result, the number of blocks to be allocated as the shared flash buffer 201 can be decreased. Thus, the number of blocks (QLC blocks) which can be allocated as the QLC region 202 can be increased.

Thus, the storage regions of the NAND flash memory 5 can be efficiently used. The size of the write buffer 51 of the host 2 can be reduced.

The write buffer 51 of the host 2 may be realized with a nonvolatile write buffer. The nonvolatile write buffer may be realized with a nonvolatile memory such as a storage class memory (SCM).

In a case where the write buffer 51 of the host 2 is realized with a nonvolatile write buffer, even if data in the internal buffer 161 is lost by a power loss such as power failure, the data can be obtained again from the nonvolatile write buffer of the host 2. Thus, even if the SSD 3 does not include a capacitor for performing a power loss protection function, it is possible to prevent the data in the internal buffer 161 from being lost by a power loss.

The shared flash buffer 201 may be realized with a nonvolatile memory such as a storage class memory (SCM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of controlling a nonvolatile memory, the nonvolatile memory including a plurality of first storage regions and a second storage region, each of the plurality of first storage regions and the second storage region including a memory cell, the method comprising:

obtaining, from a write buffer of a host, first write data associated with one or more first write requests, the one or more first write requests being for writing data to a first write destination storage region allocated from the plurality of first storage regions;

writing the first write data to the first write destination storage region in a first write mode for writing m-bit data per memory cell, m being an integer greater than or equal to two;

obtaining, from the write buffer of the host, second write data associated with one or more second write requests, the one or more second write requests being for writing data to a second write destination storage region allocated from the plurality of first storage regions;

writing the second write data to the second write destination storage region in the first write mode; and in causing a state of one of the plurality of first storage regions to transition from a first state of being allocated as a write destination storage region in which writing of data is possible to a second state in which writing of data is suspended, obtaining, from the write buffer of the host, third write data which are associated with the one or more first write requests and have not been obtained;

writing the third write data to the second storage region shared by the plurality of first storage regions, in a second write mode for writing n-bit data per memory cell, n being an integer greater than or equal to one and less than or equal to m; and causing the state of the one of the plurality of first storage regions to transition from the first state to the second state.

2. The method of claim 1, wherein the nonvolatile memory includes a plurality of blocks each including a plurality of word lines each connecting a plurality of memory cells, the first write mode is a write mode in which data written in the memory cells of a first word line of the plurality of word lines of a block allocated to each first storage region do not become readable from the memory cells of the first word line by writing the data only to the memory cells of the first word line but become readable from the memory cells of the first word line after data are written to the memory cells of one or more word lines subsequent to the first word line, and the method further comprises:

storing, in a buffer, the first write data obtained from the write buffer of the host before writing the first write data to the first write destination storage region;

obtaining, from the buffer, the first write data which have not become readable from a block allocated to the first write destination storage region; and writing the third write data, together with the obtained first write data, to the second storage region in the second write mode.

3. The method of claim 2, wherein the second write mode is a write mode in which data written in the memory cells of a second word line of the plurality of word lines of each block become readable from the memory cells of the second word line by writing the data only to the memory cells of the second word line.

4. The method of claim 1, further comprising:

in causing the state of the one of the plurality of first storage regions to transition from the first state to the second state while the second storage region is entirely filled with data written in the second write mode, selecting a third storage region from the plurality of first storage regions; and writing the third write data to the selected third storage region in the second write mode.

5. The method of claim 1, further comprising:

receiving, from the host, a write request for writing data to the one of the plurality of first storage regions which has transitioned to the second state; and in response to receiving the write request, causing the state of the one of the plurality of first storage regions to transition from the second state to the first state.

6. The method of claim 1, further comprising:

classifying write requests received from the host into a first group including the one or more first write requests for the first write destination storage region and a second group including the one or more second write requests for the second write destination storage region;

determining that a first total size of write data associated with the one or more first write requests belonging to the first group has reached a first minimum write size of the first write destination storage region;

in response to determining that the first total size has reached the first minimum write size, obtaining the first write data which has the first minimum write size, from the write buffer of the host;

determining that a second total size of write data associated with the one or more second write requests belonging to the second group has reached a second minimum write size of the second write destination storage region; and in response to determining that the second total size has reached the second minimum write size, obtaining the second write data which has the second minimum write size, from the write buffer of the host.

7. The method of claim 1, further comprising:

determining that the second storage region becomes defective; and in response to determining that the second storage region becomes defective, allocating another one of the plurality of first storage regions for writing the third write data in the second write mode.

8. The method of claim 7, wherein the writing of the third write data is performed on the second storage region unless the second storage region is defective.

9. The method of claim 1, wherein the nonvolatile memory includes a plurality of blocks, each of the plurality of blocks being a unit of a data erase operation, and each of the plurality of first storage regions is a group of two or more of the plurality of blocks.

10. The method of claim 1, wherein the transition of the state of the one of the plurality of first storage regions is performed based on a request from the host.

11. A controller configured to control a nonvolatile memory, the nonvolatile memory including a plurality of first storage regions and a second storage region, each of the plurality of first storage regions and the second storage region including a memory cell, the controller comprising:

an interface configured to be connected with a host; and a circuit configured to:

obtain, from a write buffer of the host, first write data associated with one or more first write requests, the one or more first write requests being for writing data to a first write destination storage region allocated from the plurality of first storage regions;

write the first write data to the first write destination storage region in a first write mode for writing m-bit data per memory cell, m being an integer greater than or equal to two;

obtain, from the write buffer of the host, second write data associated with one or more second write requests, the one or more second write requests being for writing data to a second write destination storage region allocated from the plurality of first storage regions;

write the second write data to the second write destination storage region in the first write mode; and in causing a state of one of the plurality of first storage regions to transition from a first state of being allocated as a write destination storage region in which writing of data is possible to a second state in which writing of data is suspended, obtain, from the write buffer of the host, third write data which are associated with the one or more first write requests and have not been obtained;

write the third write data to the second storage region shared by the plurality of first storage regions, in a second write mode for writing n-bit data per memory cell, n being an integer greater than or equal to one and less than or equal to m; and cause the state of the one of the plurality of first storage regions to transition from the first state to the second state.

12. The controller of claim 11, wherein the nonvolatile memory includes a plurality of blocks each including a plurality of word lines each connecting a plurality of memory cells, the first write mode is a write mode in which data written in the memory cells of a first word line of the plurality of word lines of a block allocated to each first storage region do not become readable from the memory cells of the first word line by writing the data only to the memory cells of the first word line but become readable from the memory cells of the first word line after data are written to the memory cells of one or more word lines subsequent to the first word line, and the circuit is further configured to:

store, in a buffer, the first write data obtained from the write buffer of the host before writing the first write data to the first write destination storage region;

obtain, from the buffer, the first write data which have not become readable from a block allocated to the first write destination storage region; and write the third write data, together with the obtained first write data, to the second storage region in the second write mode.

13. The controller of claim 12, wherein the second write mode is a write mode in which data written in the memory cells of a second word line of the plurality of word lines of each block become readable from the memory cells of the second word line by writing the data only to the memory cells of the second word line.

14. The controller of claim 11, wherein the circuit is further configured to:

in causing the state of the one of the plurality of first storage regions to transition from the first state to the second state while the second storage region is entirely filled with data written in the second write mode, select a third storage region from the plurality of first storage regions; and write the third write data to the selected third storage region in the second write mode.

15. The controller of claim 11, wherein the circuit is further configured to:

receive, from the host, a write request for writing data to the one of the plurality of first storage regions which has transitioned to the second state; and in response to receiving the write request, cause the state of the one of the plurality of first storage regions to transition from the second state to the first state.

16. The controller of claim 11, wherein the circuit is further configured to:

classify write requests received from the host into a first group including the one or more first write requests for the first write destination storage region and a second group including the one or more second write requests for the second write destination storage region;

in response to determining that a first total size of write data associated with the one or more first write requests belonging to the first group has reached a first minimum write size of the first write destination storage region, obtain the first write data which has the first minimum write size, from the write buffer of the host; and in response to determining that a second total size of write data associated with the one or more second write requests belonging to the second group has reached a second minimum write size of the second write destination storage region, obtain the second write data which has the second minimum write size, from the write buffer of the host.

17. The controller of claim 11, wherein the circuit is further configured to:

in response to determining that the second storage region becomes defective, allocate another one of the plurality of first storage regions for writing the third write data in the second write mode.

18. The controller of claim 17, wherein the writing of the third write data is performed on the second storage region unless the second storage region is defective.

19. The controller of claim 11, wherein the nonvolatile memory includes a plurality of blocks, each of the plurality of blocks being a unit of a data erase operation, and each of the plurality of first storage regions is a group of two or more of the plurality of blocks.

20. The controller of claim 11, wherein the transition of the state of the one of the plurality of first storage regions is performed based on a request from the host.

* * * * *